(12) United States Patent
Patel et al.

(10) Patent No.: US 12,100,862 B1
(45) Date of Patent: Sep. 24, 2024

(54) ELECTRICALLY CONDUCTIVE APPARATUS

(71) Applicant: Rivian IP Holdings, LLC, Irvine, CA (US)

(72) Inventors: Neil Patel, Costa Mesa, CA (US); Nilesh Ashok Kharat, Tustin, CA (US); Karthik Gundappa Balte, Laguna Niguel, CA (US); Akshay Kishor Murkute, Irvine, CA (US); Kyle Butterfield, Ladera Ranch, CA (US); James Daisuke Spence, Ontario, CA (US); Chad Jackson Hardgrove, Tustin, CA (US); Karteek Pallerla, Irvine, CA (US); Tyler Collins, Irvine, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/338,971

(22) Filed: Jun. 21, 2023

(51) Int. Cl.
| H01M 50/503 | (2021.01) |
| H01M 10/653 | (2014.01) |
| H01M 50/249 | (2021.01) |
| H01M 50/256 | (2021.01) |
| H01M 50/262 | (2021.01) |
| B60L 50/64 | (2019.01) |

(52) U.S. Cl.
CPC ....... *H01M 50/503* (2021.01); *H01M 10/653* (2015.04); *H01M 50/249* (2021.01); *H01M 50/256* (2021.01); *H01M 50/262* (2021.01); *B60L 50/64* (2019.02); *H01M 2220/20* (2013.01)

(58) Field of Classification Search
CPC ............. H01M 50/503; H01M 10/653; H01M 50/249; H01M 50/262; H01M 50/256; H01M 2220/20
See application file for complete search history.

(56) References Cited

U.S. PATENT DOCUMENTS

| 8,142,234 B2 | 3/2012 | Kaneshiro | |
| 11,322,803 B2 | 5/2022 | O'Neil | |
| 2018/0151921 A1* | 5/2018 | Yun | H01M 50/211 |
| 2019/0296310 A1* | 9/2019 | Newman | H01M 50/516 |

OTHER PUBLICATIONS

Rotaloc International, Ltd., Adhesive-Backed (VHB) Bonding Fasteners, retrieved from https://www.rotaloc.com/vhb on Aug. 11, 2023, 1 pg.
Non-Final Office Action on U.S. Appl. No. 18/524,069 dated Apr. 9, 2024.

* cited by examiner

*Primary Examiner* — Lingwen R Zeng
(74) *Attorney, Agent, or Firm* — Foley & Lardner LLP

(57) ABSTRACT

An electrically conductive member can include a first opening and a second opening. The first opening of the electrically conductive member can engage a first member of a cell carrier to at least partially align the electrically conductive member with the cell carrier. The second opening of the electrically conductive member can engage with a second member of the cell carrier for coupling the electrically conductive member with the cell carrier.

12 Claims, 18 Drawing Sheets

ELECTRICALLY CONDUCTIVE APPARATUS

INTRODUCTION

An electric vehicle includes battery cells that are coupled to an electrically conductive member to provide power to the electric vehicle.

SUMMARY

The present disclosure is directed to a busbar for a battery module. The busbar can include at least one opening to engage with a stake (e.g., a pin) of a battery cell carrier (e.g., a tote, a battery module tote), where the pin can heat stake the busbar to the cell carrier. The busbar can include at least one second opening to receive at least one datum locator (e.g., a two-way locator and a four-way locator) protruding from the cell carrier. The busbar can include an overmold member, the overmold member including at least one retention arm to engage with an opening of the cell carrier to couple the busbar and overmold with the cell carrier. The busbar can include an edge that can couple (e.g., weld with) a fold-down flap of a module current collector. The busbar can include a module-to-module ("M2M") terminal block. For example, the M2M block can be coupled with the busbar via a welding operation; the M2M terminal block can be a separate component coupled with the busbar such that the M2M terminal block can include a thickness or plating that differs from the busbar. The busbar overmold can include a retention device to retain a cable (e.g., a ribbon cable of a voltage sensing harness) against the busbar. For example, the busbar overmold can include a first retention member to retain the tail of the voltage sensing harness and a second retention member to retain a thermistor wire, for example.

At least one aspect is directed to an apparatus. The apparatus can be an electrically conductive member. The electrically conductive member can include a first opening and a second opening. The first opening of the electrically conductive member can engage a first member of a cell carrier to at least partially align the electrically conductive member with the cell carrier. The second opening of the electrically conductive member can engage with a second member of the cell carrier for coupling the electrically conductive member with the cell carrier.

At least one aspect is directed to a system. The system can include a busbar, a cell carrier, and a member. The cell carrier can include a cell carrier opening. The member can include a retention arm and a member opening. The retention arm of the member can engage with the cell carrier opening to couple the member to the cell carrier. The member opening can receive a protrusion of the cell carrier. The protrusion can be configured to expand within the member opening to couple the busbar with the cell carrier.

At least one aspect is directed to a method. The method can include engaging a locator of a cell carrier with a locating opening of a busbar. The locator can at least partially align the busbar with the cell carrier. The method can include engaging a heat stake of the cell carrier with a heat stake opening of the busbar, the heat stake for coupling the busbar with the cell carrier.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems of busbars for battery packs or battery modules. The various concepts introduced above and discussed in greater detail below may be implemented in any of numerous ways.

The present disclosure is directed to a busbar for a battery module. The busbar can include at least one opening to engage with a stake (e.g., a pin) of a cell carrier (e.g., a tote, a battery module tote, or some other carrier), where the pin can heat stake the busbar to the cell carrier. The busbar can include at least one second opening to receive at least one datum locator (e.g., a two-way locator and a four-way locator) protruding from the cell carrier. The busbar can include an overmold member, the overmold member including at least one retention arm extending therefrom. The retention arm can engage with an opening (e.g., a slot) of the cell carrier to couple the busbar and overmold with the cell carrier. The busbar can include an edge that can couple (e.g., weld with) a fold-down flap of a module current collector. The busbar can include a module-to-module ("M2M") terminal block. For example, the M2M block can be coupled with the busbar via a welding operation; the M2M terminal block can be a separate component coupled with the busbar such that the M2M terminal block can include a thickness that differs from a thickness of the busbar. Because the busbar and the M2M terminal block can be separate components, the busbar can be plated, while the M2M terminal block can be unplated (e.g., without any plating or with a different type of plating). The busbar overmold can include a retention device to retain a cable (e.g., a ribbon cable of a voltage sensing harness) against the busbar. For example, the retention device can be a prong, clip, latch, cage, or other device. The busbar overmold can include a first retention member to retain the tail of the voltage sensing harness and a second retention member to retain a thermistor wire, for example.

Figure 1:
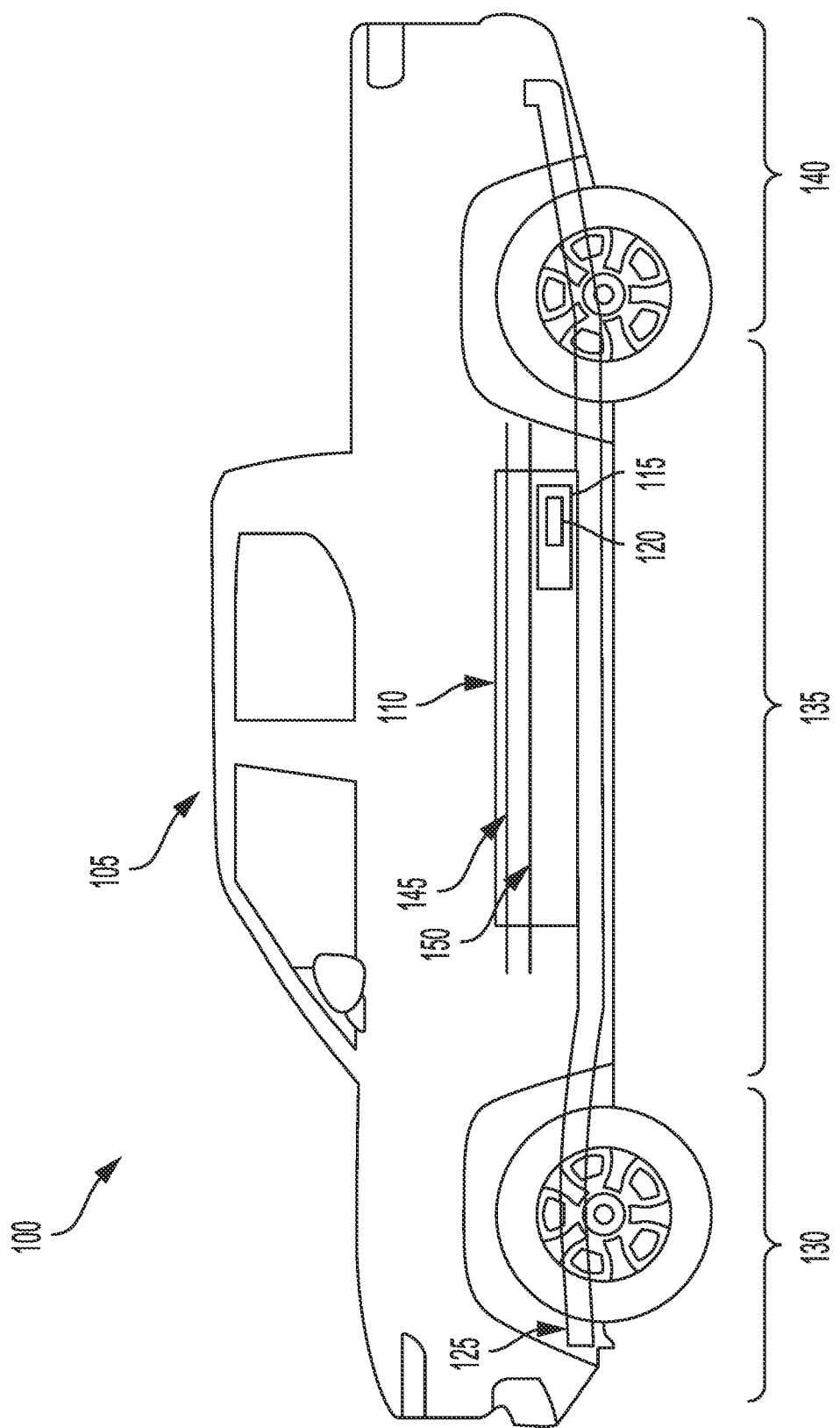
FIG. 1 depicts an example electric vehicle, in accordance with some aspects.

FIG. 1 depicts an example cross-sectional view 100 of an electric vehicle 105 installed with at least one battery pack 110. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 110 can also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, batteries 115 or battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery 115, the battery modules 115, or the battery cells 120 with other electrical components of the electric vehicle 105 to provide electrical power to various systems or components of the electric vehicle 105.

Figure 2:
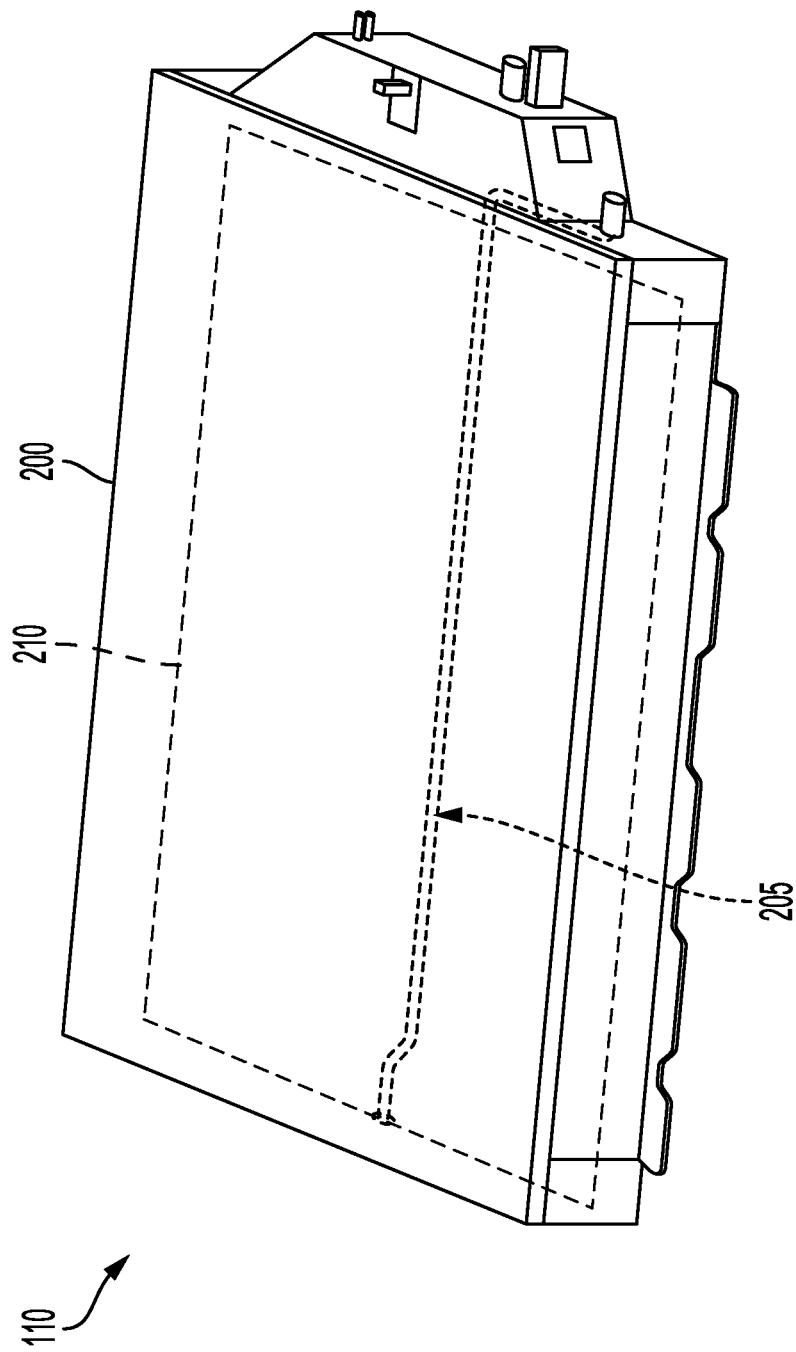
FIG. 2 depicts an example battery pack, in accordance with some aspects.

FIG. 2 depicts an example battery pack 110. Referring to FIG. 2, among others, the battery pack 110 can provide power to electric vehicle 105. Battery packs 110 can include any arrangement or network of electrical, electronic, mechanical, or electromechanical devices to power a vehicle of any type, such as the electric vehicle 105. The battery pack 110 can include at least one housing 200. The housing 200 can include at least one battery module 115 or at least one battery cell 120, as well as other battery pack components. The battery module 115 can be or can include one or more groups of prismatic cells, cylindrical cells, pouch cells, or other form factors of battery cells 120. The housing 200 can include a shield on the bottom or underneath the battery module 115 to protect the battery module 115 and/or cells 120 from external conditions, for example if the electric vehicle 105 is driven over rough terrains (e.g., off-road, trenches, rocks, etc.) The battery pack 110 can include at least one cooling line 205 that can distribute fluid through the battery pack 110 as part of a thermal/temperature control or heat exchange system that can also include at least one thermal component (e.g., cold plate) 210. The thermal component 210 can be positioned in relation to a top submodule and a bottom submodule, such as in between the top and bottom submodules, among other possibilities. The battery pack 110 can include any number of thermal components 210. For example, there can be one or more thermal components 210 per battery pack 110, or per battery module 115. At least one cooling line 205 can be coupled with, part of, or independent from the thermal component 210.

Figure 3:
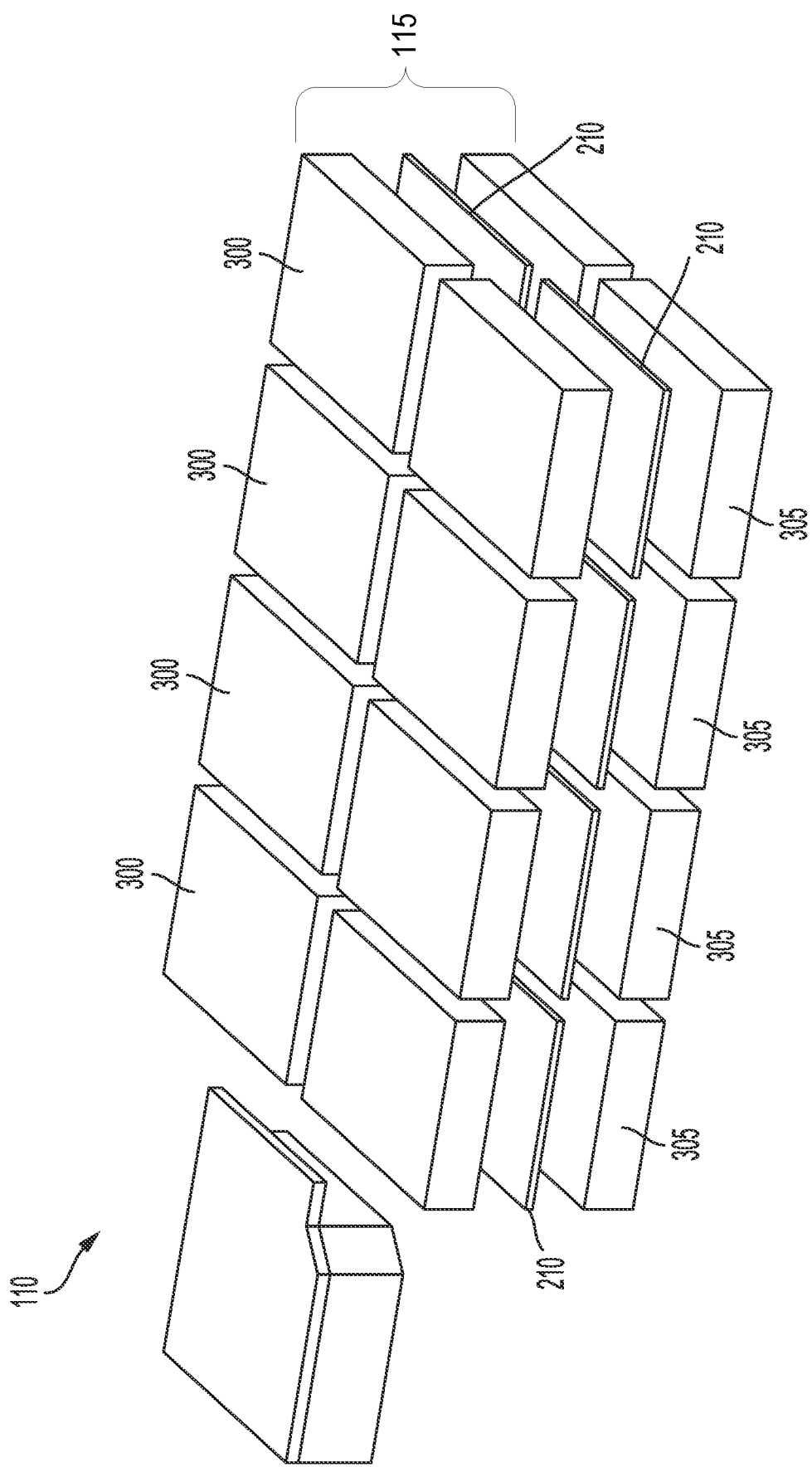
FIG. 3 depicts an example battery module, in accordance with some aspects.
Figure 17:
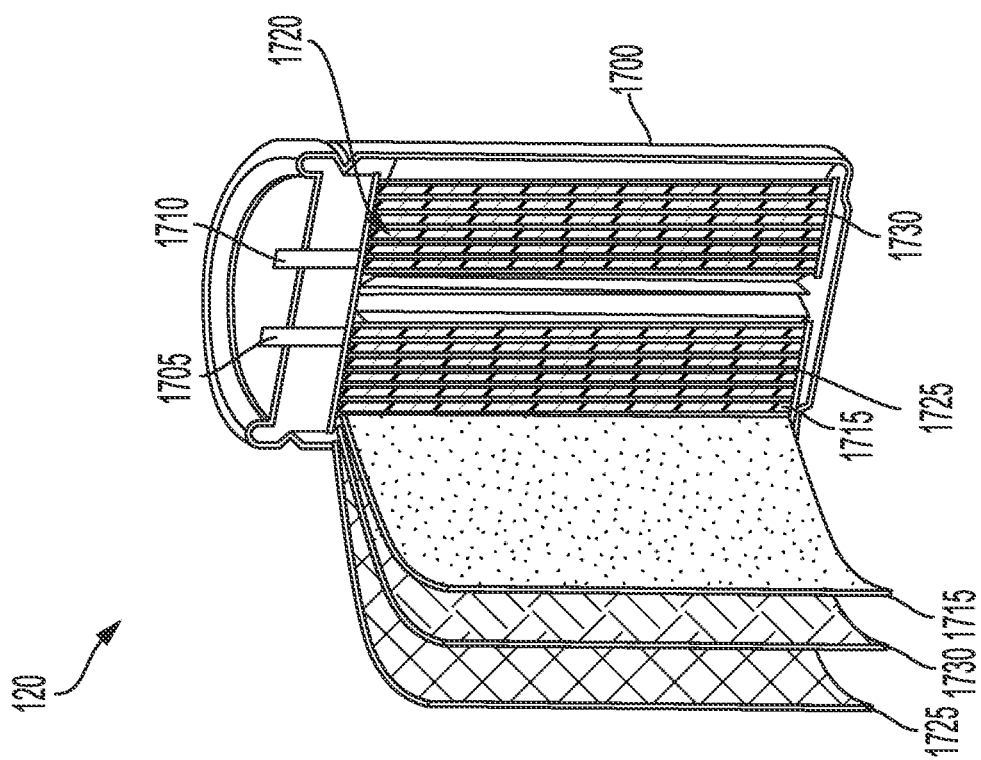
FIG. 17 depicts a cross sectional view of an example battery cell, in accordance with some aspects.
Figure 18:
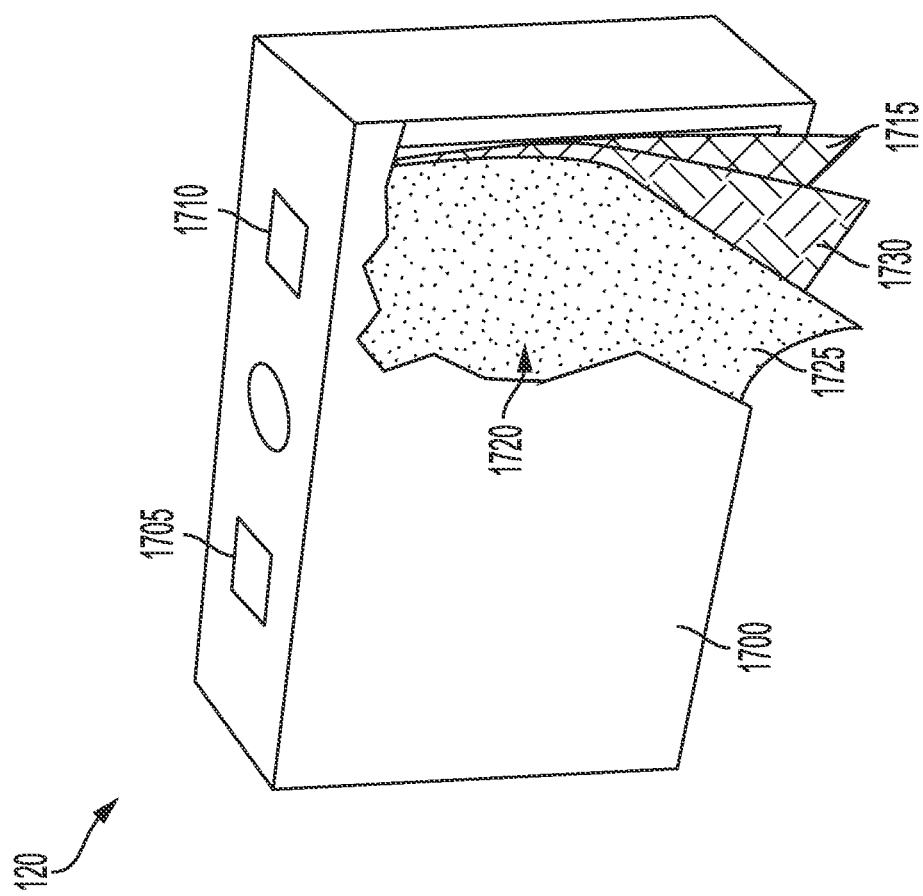
FIG. 18 depicts a cross sectional view of an example battery cell, in accordance with some aspects.
Figure 19:
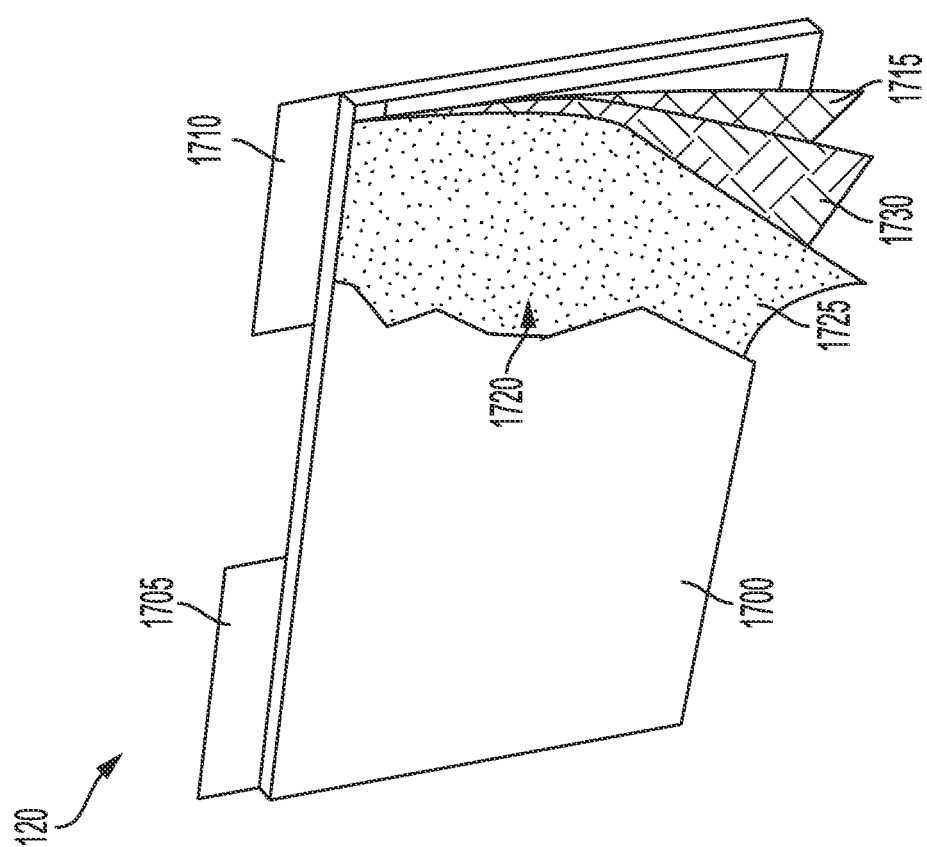
FIG. 19 depicts a cross sectional view of an example battery cell, in accordance with some aspects.

FIG. 3 depicts example battery modules 115, and FIGS. 17, 18 and 19 depict an example cross sectional view of a battery cell 120. The battery modules 115 can include at least one submodule. For example, the battery modules 115 can include at least one first (e.g., top) submodule 300 or at least one second (e.g., bottom) submodule 305. At least one thermal component 210 can be disposed between the top submodule 300 and the bottom submodule 305. For example, one thermal component 210 can be configured for heat exchange with one battery module 115. The thermal component 210 can be disposed or thermally coupled between the top submodule 300 and the bottom submodule 305. One thermal component 210 can also be thermally coupled with more than one battery module 115 (or more than two submodules 300, 305). The thermal components 210 shown adjacent to each other can be combined into a single thermal component 210 that spans the size of one or more submodules 300 or 305. The thermal component 210 can be positioned underneath submodule 300 and over submodule 305, in between submodules 300 and 305, on one or more sides of submodules 300, 305, among other possibilities. The thermal component 210 can be disposed in sidewalls, cross members, structural beams, among various other components of the battery pack, such as battery pack 110 described above. The battery submodules 300, 305 can collectively form one battery module 115. In some examples each submodule 300, 305 can be considered as a complete battery module 115, rather than a submodule.

The battery modules 115 can each include a plurality of battery cells 120. The battery modules 115 can be disposed within the housing 205 of the battery pack 110. The battery modules 115 can include battery cells 120 that are cylindrical cells or prismatic cells, for example. The battery module 115 can operate as a modular unit of battery cells 120. For example, a battery module 115 can collect current or electrical power from the battery cells 120 that are included in the battery module 115 and can provide the current or electrical power as output from the battery pack 110. The battery pack 110 can include any number of battery modules 115. For example, the battery pack can have one, two, three, four, five, six, seven, eight, nine, ten, eleven, twelve or other number of battery modules 115 disposed in the housing 205. It should also be noted that each battery module 115 may include a top submodule 300 and a bottom submodule 305, possibly with a thermal component 210 in between the top submodule 300 and the bottom submodule 305. The battery pack 110 can include or define a plurality of areas for positioning of the battery module 115 and/or cells 120. The battery modules 115 can be square, rectangular, circular, triangular, symmetrical, or asymmetrical. In some examples, battery modules 115 may be different shapes, such that some battery modules 115 are rectangular but other battery modules 115 are square shaped, among other possibilities. The battery module 115 can include or define a plurality of slots, holders, or containers for a plurality of battery cells 120. It should be noted the illustrations and descriptions herein are provided for example purposes and should not be interpreted as limiting. For example, the battery cells 120 can be inserted in the battery pack 110 without battery submodules 300 and 305. The battery cells 120 can be disposed in the battery pack 110 in a cell-to-pack configuration without submodules 300 and 305, among other possibilities.

Figure 4:
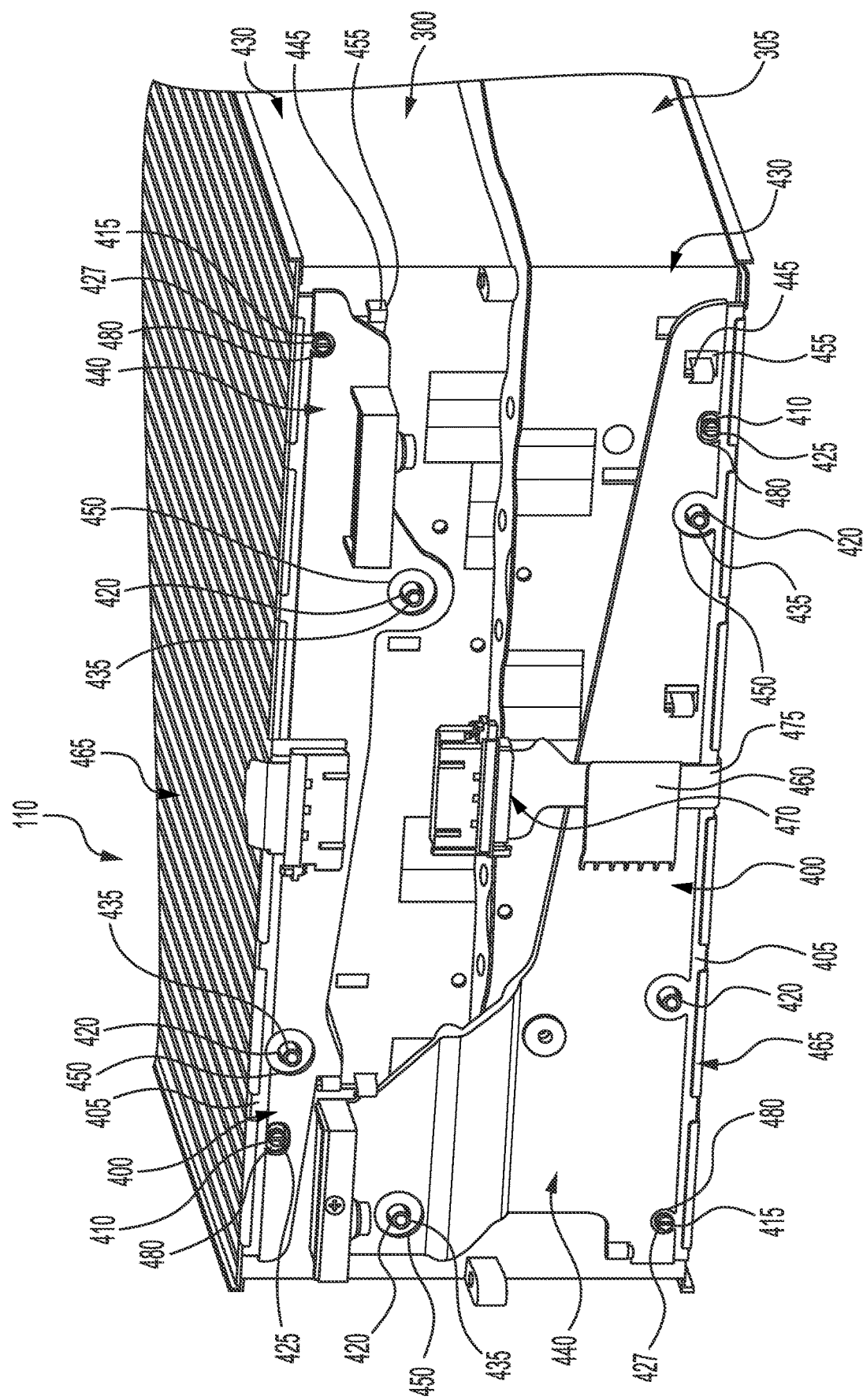
FIG. 4 depicts an example battery pack with a busbar assembly, in accordance with some aspects.
Figure 5:
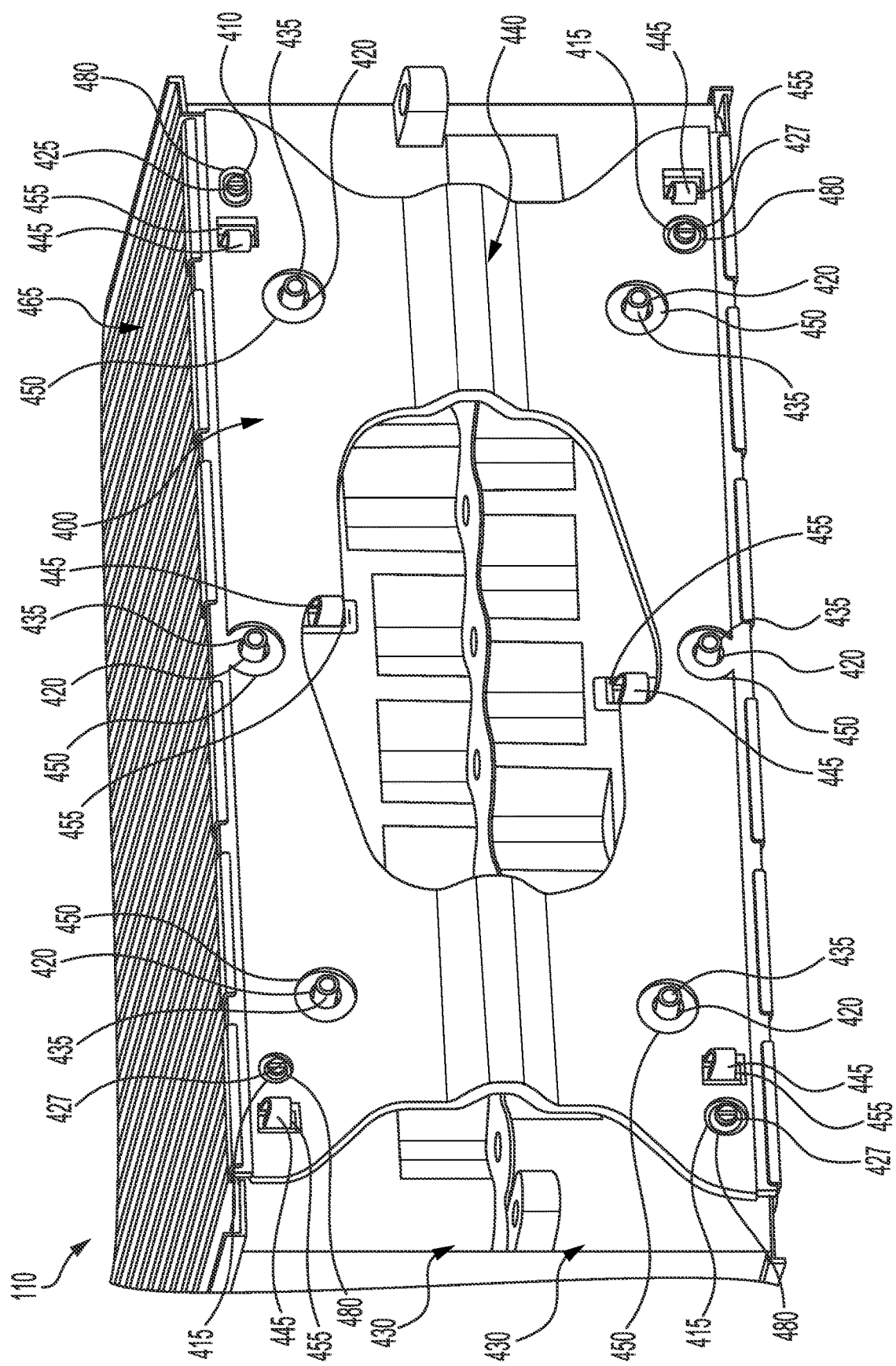
FIG. 5 depicts an example battery pack with a busbar assembly, in accordance with some aspects.

As depicted in FIGS. 4 and 5, among others, the battery pack 110 can include a busbar assembly 400. The busbar assembly 400 can include at least one busbar 405 (e.g., an electrically conductive member 405). The busbar 405 can be an electrically conductive member capable of conducting electricity. For example, the busbar 405 can be coupled with the battery cells 120 of the battery pack 110. The battery pack 110 can include the submodule 300 and the submodule 305 housed within a cell carrier 430 (e.g., a tote 430, a battery tote 430, a battery module tote 430). The battery pack 110 can include a busbar 405 coupled to each of the submodule 300 or the submodule 305. For example, the battery pack 110 can include at least one busbar 405 electrically coupled with a first submodule 300 and a second busbar 405 electrically coupled with a second submodule 305. For example, as depicted in FIG. 4, among others, the battery pack 110 can include a first busbar 405 coupled with the submodule 300 (e.g., a first module) and a second busbar 405 coupled with the submodule 305 (e.g., a second module). As depicted in FIG. 5, among others, the battery pack 110 can include a single busbar 405 electrically coupled with both the submodule 300 and the submodule 305.

The busbar 405 can be electrically coupled with the battery cells 120 of the submodule 300 or the battery cells of the submodule 305. For example, the busbar 405 can be electrically coupled with a current collector 465. The current collector 465 can be coupled the battery cells 120 (e.g., multiple battery cells 120) of the submodule 300 or the submodule 305. For example, the current collector 465 can include an electrically conductive material to electrically couple with each of the battery cells 120 within the submodule 300 or the submodule 305. The busbar 405 can electrically couple with the current collector 465 such that the busbar 405 can be electrically coupled with one or more of the battery cells 120 (e.g., all of the battery cells 120) of the submodule 300 or the submodule 305. The busbar 405 can thus conduct electricity provided by the battery cells 120 of the battery pack 110. The battery pack 110 can include multiple busbars 405 having varying polarity. For example, one busbar 405 can have a positive polarity and can be coupled with a positive terminal of battery cells 120. The busbar 405 can include a negative polarity and can be coupled with a negative terminal of the battery cells 120. For example, the busbar 405 (e.g., the busbar 405 depicted in FIG. 5) can electrically couple the submodule 300 or the submodule 305 in series to facilitate an electrical coupling of the positive terminals of battery cells 120 of one module with the negative terminals of battery cells 120 of another module. Unless stated otherwise, it is understood that the features of the busbar 405 discussed below are applicable to busbars 405 having a positive polarity, a negative polarity, or some other polarity.

The battery pack 110 can include the busbar 405 coupled with the cell carrier 430. For example, the busbar 405 can be mechanically coupled with the cell carrier 430. The busbar 405 can be mechanically coupled with the cell carrier 430 with the busbar 405 also electrically coupled with the current collector 465. As depicted in FIGS. 4 and 5, among others, a busbar assembly 400 can include the busbar 405 and a member 440 (e.g., an overmold member 440), each of which can include one or more features to facilitate the locating and coupling of the busbar 405 with respect to the cell carrier 430. For example, the busbar 405 can include at least first opening. The first opening can be a datum locator opening, such as a first datum locator opening 410 or a second datum locator opening 415. For example, the busbar 405 can include one datum locator opening 410 and one datum locator opening 415. The datum locator opening 410 and the datum locator opening 415 can be openings (e.g., holes, apertures) defined by the busbar 405. The datum locator opening 410 and the datum locator opening 415 can be configured to receive at least one datum locator to locate the busbar 405 relative to the cell carrier 430.

For example, the cell carrier 430 can include a first member. The first member can include a first datum locator 425 or a second datum locator 427. For example, the cell carrier 430 can include at least one first datum locator 425 and at least one second datum locator 427. The first datum locator 425 can engage with (e.g., be received in) the first datum locator opening 410. The second datum locator 427 can engage with (e.g., be received in) the second datum locator opening 415. For example, the first datum locator 425 can be a two-way datum locator that can positionally constrain the busbar 405 in two directions (e.g., left and right) with the first datum locator 425 engaged with the first datum locator opening 410 of the busbar 405. The second datum locator 427 can be a four-way datum locator that can positionally constrain the busbar 405 in four directions (e.g., left, right, up, down) with the second datum locator 427 engaged with (e.g., received in) the second datum locator opening 415 of the busbar 405. For example, the busbar 405 can be aligned or at least partially aligned with the cell carrier 430 with the first datum locator 425 engaged with the first datum locator opening 410 and with the second datum locator 427 engaged with the second datum locator opening 415. The busbar 405 can be aligned with the cell carrier 430 with the busbar 405 positioned at or within some distance (e.g., within two inches in any direction) of a position in which the busbar 405 will reside once coupled with the cell carrier 430, such as after a heat staking operation as discussed in detail below with reference to FIGS. 4-6. For example, the busbar 405 can be partially aligned with the cell carrier 430 with a portion of the busbar 405 (e.g., one side, one edge) is at or within some distance (e.g., within two inches in any direction) of a position in which the busbar 405 will reside once coupled to the cell carrier 430. The busbar 405 can be aligned with the cell carrier 430 with the busbar 405 positioned to be coupled with the current collector 465, as is discussed in detail below with reference to FIGS. 9 and 10. For example, the position of the busbar 405 on the cell carrier 430 can be a position within which the busbar 405 can be coupled with the cell carrier 430 or electrically coupled with the current collector 465. For example, the busbar 405 can be electrically coupled with the current collector 465 with the busbar 405 at least partially aligned with the cell carrier 430 via an engagement between the first datum locator 425 within the first datum locator opening 410 and via an engagement between the second datum locator 427 with the second datum locator opening 415.

The busbar 405 can include at least one second opening 420. For example, the second opening 420 can be a heat stake opening 420 that can receive a heat stake to couple the busbar 405 with the cell carrier 430. For example, the opening 420 can be an opening (e.g., a hole, an aperture) defined by the busbar 405. The opening 420 can engage with (e.g., receive) a protrusion 435 of the cell carrier 430. For example, the cell carrier 430 can include at least one protrusion 435 extending therefrom. The protrusion 435 can be a stake 435 (e.g., a heat stake 435). The protrusion 435 can expand when heated or otherwise exposed to heat. For example, the protrusion 435 can be configured to deform over the opening 420 of the busbar 405 when heated to couple the busbar 405 against the cell carrier 430. The protrusion 435 can increase in diameter along at least a portion of a length of the protrusion when the protrusion is heated (e.g., exposed to heat by a heat gun or some other heat staking device). An initial diameter of the protrusion 435 can be selected such that the protrusion 435 can be received in the opening 420 of the busbar 405. For example, the protrusion 435 (or the cell carrier 430 more broadly) can be or include a polymeric or composite material that can be melted, deformed, expand, or otherwise have its form altered when heated.

Figure 6:
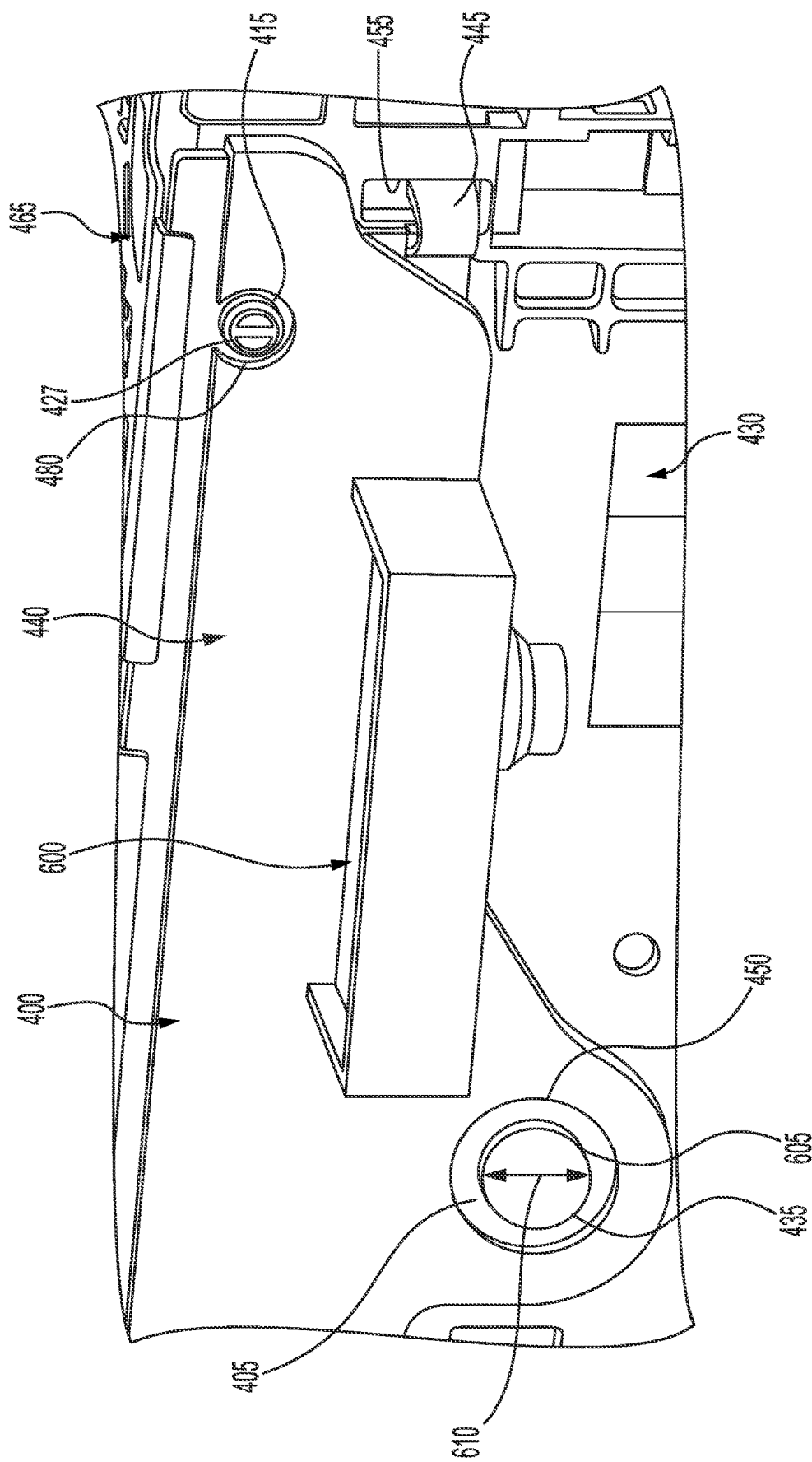
FIG. 6 depicts an example terminal block of a busbar assembly, in accordance with some aspects.

As depicted in FIG. 6, among others, the protrusion 435 can have an end portion 605 after the protrusion 435 is exposed to heat (e.g., during a heat staking operation). For example, the end portion 605 of the protrusion 435 can include a diameter 610 after exposure to heat (e.g., a heat staking operation) that can be greater than a diameter of the opening 420 of the busbar 405. The diameter 610 can be larger than a diameter of the opening 420 such that the end portion 605 of the protrusion 435 cannot pass through the opening 420. For example, because the protrusion 435 is not expanded prior to a heat staking operation, as depicted in FIGS. 4-5 among others, the protrusion 435 can pass through the opening 420 prior to the heat staking operation. Then, with the protrusion 435 at least partially extending through the opening 420, heat can be applied to the protrusion 435 to transform (e.g., melt, deform, shape) the protrusion 435 to create the end portion 605 having the diameter 610. The end portion 605 can be or include a disc or puck-shaped member that can have the diameter 610. Because the diameter 610 can be greater than the diameter of the opening 420, the end portion 605 the protrusion 435 can prevent the busbar 405 from separating from the cell carrier 430. For example, busbar 405 can be coupled with the cell carrier 430 with the protrusion 435 of the tote extending through the opening 420 of the busbar 405 and with the protrusion 435 heat staked (e.g., to create the end portion 605 having the diameter 610.

The busbar 405 can include multiple openings 420, and each opening 420 can receive a protrusion 435 of the cell carrier 430. Each of the protrusions 435 can expand upon exposure to heat (e.g., a heat staking operation) to cause the protrusion 435 to form the end portion 605 having the diameter 610. Each of the end portions 605 can couple the busbar 405 against the cell carrier 430. For example, the busbar 405 can be rigidly coupled against the cell carrier 430 with the protrusions 435 of the cell carrier 430 extending through the openings 420 of the busbar 405 and heat staked to create the end portions 605. By using at least one protrusion 435 engaged with at least one opening 420, the busbar 405 can be coupled with the cell carrier 430 without the need for an adhesive between the busbar 405 and the cell carrier 430 to couple the busbar 405 with the cell carrier 430. For example, the busbar 405 can be coupled with the cell carrier 430 without any adhesives positioned between the busbar 405 and the cell carrier 430.

As depicted in FIGS. 4-6, among others, the busbar assembly 400 can include the overmold member 440. The overmold member 440 can be a polymeric layer (e.g., a plastic layer) that can be coupled with at least one side of the busbar 405. For example, the overmold member 440 can be a polymeric member that can be molded (e.g., injection molded, compression molded, or otherwise molded) over the busbar 405 such that the overmold member 440 can be coupled with the busbar 405. The overmold member 440 can generally conform to a form factor or shape of the busbar 405. The overmold member 440 can have some shape or form factor that differs from a shape or form factor of the busbar 405. The overmold member 440 can include at least one retention arm 445 (e.g., a locating arm 445), at least one overmold opening 450 (e.g., a heat stake opening 450), and at least one datum opening 480. The retention arm 445 of the overmold member 440 can engage with an opening 455 (e.g., a retention arm opening 455) of the cell carrier 430. For example, the cell carrier 430 can define at least one opening 455. The opening 455 can be an opening (hole, passage, aperture, indentation, depression, pocket, or other feature) formed into the cell carrier 430. For example, the opening 455 can be a depression in the cell carrier 430 that can receive at least one retention arm 445 of the overmold member 440, as is discussed in detail below with reference to FIGS. 11-13. The datum opening 480 can correspond with (e.g., at least partially align with, be at least partially concentric with) the first datum locator opening 410 or the second datum locator opening 415 of the busbar 405.

The overmold opening 450 can be an opening (e.g., an aperture, a hole, or some other opening) defined by the overmold member 440. The overmold opening 450 opening can at least partially align with the opening 420 of the busbar 405. For example, the overmold opening 450 can be coaxial with the opening 420 of the busbar 405. The overmold opening 450 can include a diameter that is greater than a diameter of the opening 420. For example, the overmold opening 450 can include a diameter that is two times, three times, four times, or some other multiple larger than a diameter of the opening 420. At least a portion of the busbar 405 can be visible via the overmold opening 450. For example, as depicted in FIG. 6, among others, because the overmold opening 450 can include a diameter that is greater than a diameter of the opening 420 of the busbar 405, a portion of the busbar 405 can be visible between an edge of the overmold opening 450 and an edge of the opening 420 of the busbar 405. The overmold member 440 can include the overmold opening 450 having a diameter that is greater than the diameter 610 of the end portion 605 of the protrusion 435 after exposure to heat (e.g., a heat staking operation). For example, the protrusion 435 of the cell carrier 430 can extend at least partially through the opening 420 of the busbar 405 and at least partially through the overmold opening 450. As discussed above, the protrusion 435 can expand (e.g., deform, melt, change shape) when exposed to heat (e.g., during a heat staking operation) such that the end portion 605 of the protrusion 435 can form. The end portion 605 of the protrusion 435 can include the diameter 610 that is greater than the diameter of the opening 420 to couple the busbar 405 with the cell carrier 430. The end portion 605 can include the diameter 610 being less than the diameter of the overmold opening 450 such that the end portion 605 can be positioned against the busbar 405 and within the overmold opening 450. For example, the end portion 605 can be flush with an outer surface of the overmold member 440 or recessed relative to the overmold member 440. The end portion 605 can extend beyond an outer surface of the overmold member 440.

Figure 7:
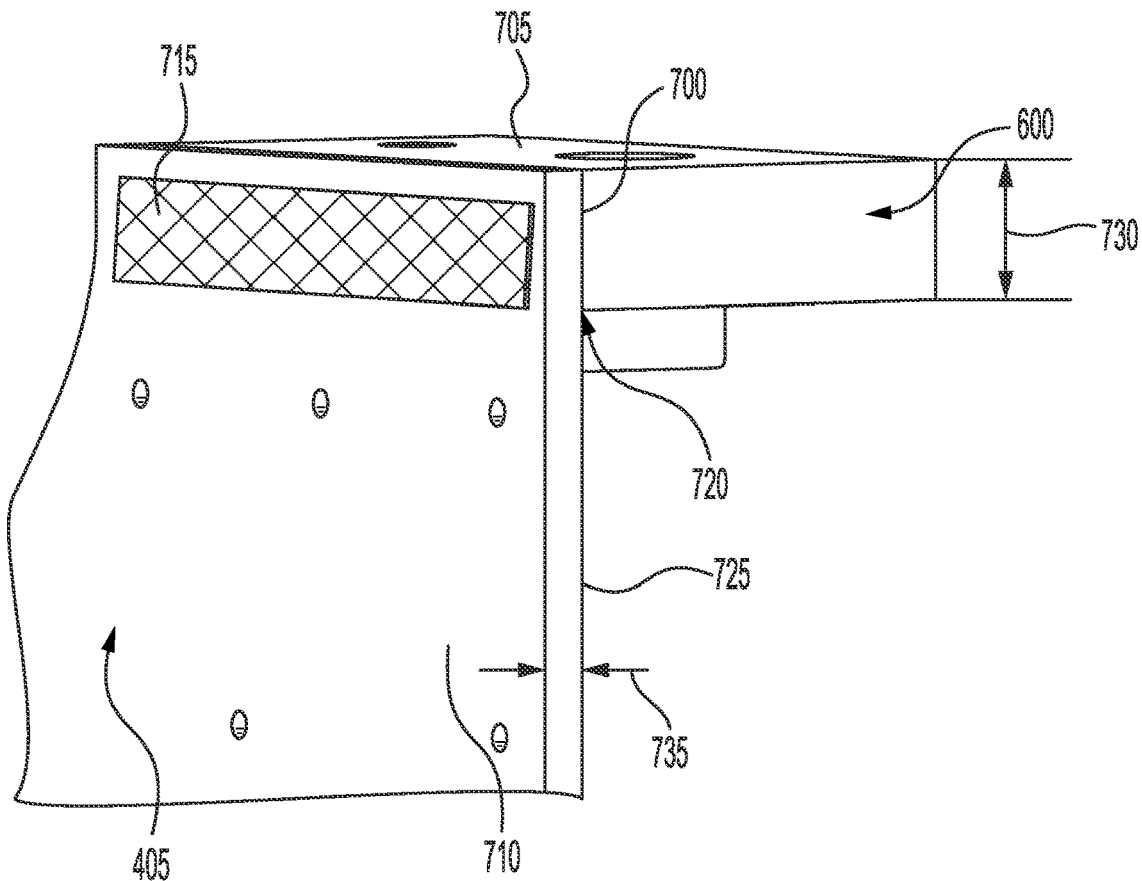
FIG. 7 depicts an example, battery pack with busbar assembly, in accordance with some aspects.
Figure 8:
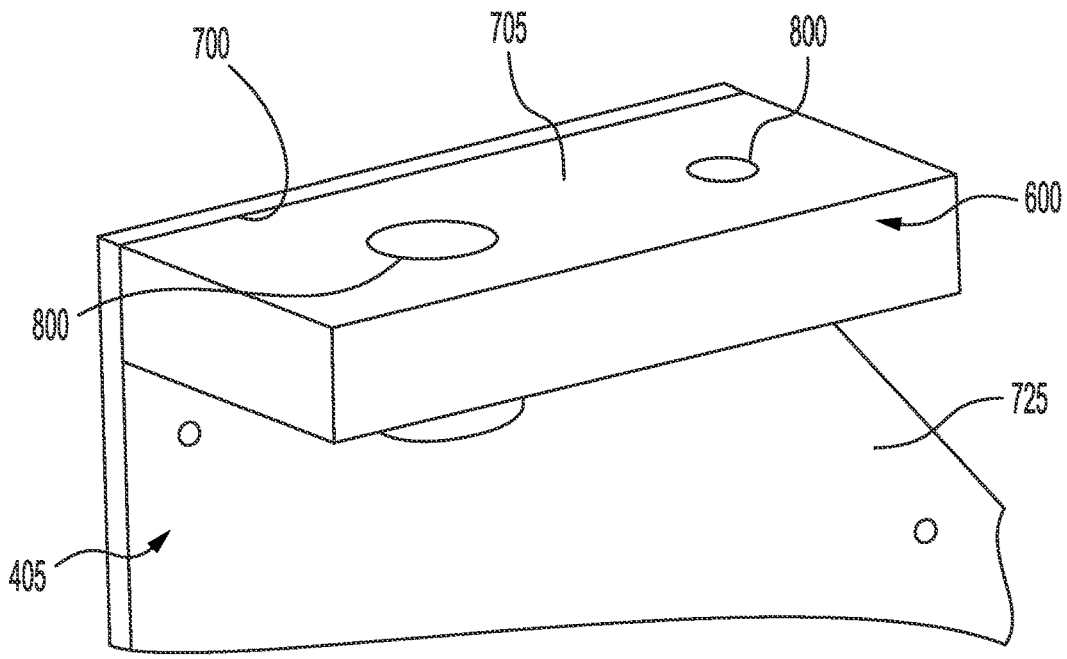
FIG. 8 depicts an example current collector coupled with a busbar assembly, in accordance with some aspects.

As depicted in FIGS. 6-8, the busbar assembly 400 can include the busbar 405 coupled with a terminal block 600. The terminal block 600 can be an electrically conductive block extending from the busbar 405 (e.g., extending perpendicularly from the busbar. For example, the terminal block 600 can be a metallic component capable of conducting electricity to facilitate electrical coupling with the busbar 405. The terminal block 600 can be a separate component that can be joined with the busbar 405. For example, the terminal block 600 can be welded (e.g., laser welded or welded via some other operation) with the busbar 405. The terminal block 600 can be a separate component that is joined with the busbar 405 rather than being stamped or otherwise created to be integral with the busbar 405. The terminal block 600 can be electrically coupled with another object (e.g., another busbar, another busbar coupled with another module, or some other component). For example, the terminal block 600 can be electrically coupled with another battery module (e.g., the submodule 300 or the submodule 305), whether directly or indirectly. The terminal block 600 can therefore facilitate the electrical coupling of the busbar 405 with another component, such as another module (e.g., the submodule 300 or the submodule 305, or another busbar 405 coupled with another module). The terminal block 600 can include a surface 705 to facilitate electrical coupling of the terminal block 600 with some other object. The terminal block 600 can include at least one coupling feature 800. For example, as depicted in FIG. 8, among others, the terminal block 600 can include the coupling feature 800 as an opening (e.g., hole, aperture, threaded opening, or some other opening) that can facilitate mechanical coupling (e.g., fastening) the terminal block 600 with another object. The coupling feature 800 can be an opening formed completely through or partially through the terminal block 600.

As depicted in FIGS. 7 and 8, among others, the terminal block 600 can be joined with the busbar 405 at an interface 700. For example, the interface 700 can be an interface between a side of the terminal block 600 and an outer surface 725 of the busbar 405. The terminal block 600 and the busbar 405 can be electrically coupled via contact between the terminal block 600 and the busbar 405 at the interface 700. For example, the terminal block 600 can be welded (e.g., laser welded) with the busbar 405 to electrically couple the terminal block 600 with the busbar 405. For example, the terminal block 600 can be joined at the interface 700 via a joint 715. The joint 715 can be a portion of the busbar 405 that is joined with the terminal block 600 to mechanically couple the busbar 405 with the terminal block 600. The joint 715 can be an area of the busbar 405 adjacent to the interface 700. The joint 715 can be a weld joint 715, for example. The weld joint 715 can be formed on or within an area of the busbar 405 adjacent the interface 700. For example, the weld joint 715 can include a portion of the busbar 405 and a portion of the terminal block 600 at the interface 700 that can be melted, melded, or otherwise joined. The busbar 405 can be coupled with the terminal block 600 via a welding operation to create the weld joint 715. For example, the terminal block 600 can be laser welded with the busbar 405 to mechanically and electrically couple the terminal block 600 with the busbar 405. A laser welding device can emit (e.g., direct, shoot, provide) a laser beam towards an area of the busbar 405 adjacent to the interface 700. For example, the laser welding device can emit the laser beam toward a surface 710 (e.g., an inner surface 710) of the busbar 405, where the laser beam can penetrate the terminal block 600 via the busbar 405 to create the weld joint 715.

The terminal block 600 can include a terminal block material thickness 730 that can be greater than a material thickness 735 of the busbar 405. For example, because the terminal block 600 can be a separate component from the busbar 405, the busbar 405 and the terminal block 600 can be or include separate material having a separate thickness or gauge. The terminal block 600, for example, can include the terminal block material thickness 730 that can be greater (e.g., two times greater, three times greater, or some other multiple greater) than the material thickness 735 of the busbar 405. The greater terminal block material thickness 730 can provided for improved thermal characteristics of the terminal block 600 or the busbar 405 when the terminal block 600 or the busbar 405 are conducting electricity.

The greater terminal block material thickness 730 provide larger weld joint 715 between the terminal block 600 and the busbar 405. For example, the terminal block 600 can be coupled with an outer surface 725 of the busbar 405 at the interface 700. Because the terminal block 600 includes the terminal block material thickness 730 that can be greater than the material thickness 735 of the busbar 405, the weld joint 715 that joins the busbar 405 with the terminal block 600 can also be greater. The increased thickness of the weld joint 715 can provide increased mechanical integrity for the weld joint 715. The increased thickness of the weld joint 715 can provided for improved thermal characteristics with the busbar 405 and the terminal block 600 electrically coupled.

The terminal block 600 can include a plating or an absence of plating. The busbar 405 can include a plating. For example, because the busbar 405 and the terminal block can be separate components, the plating of the terminal block 600 need not be the same as the plating of the busbar 405. For example, the busbar 405 can undergo a plating operation to achieve a first plating. The first plating can be aluminum plating, copper plating, nickel plating, or some other plating. The busbar 405 can remain unplated (e.g., be without any plating). For example, the busbar 405 may not undergo any plating operation such that the busbar 405 is unplated. The busbar 405 can include an absence of plating such that the busbar 405 is at least partially unplated. The terminal block 600 can undergo a plating operation separate from the plating operation of the busbar 405. For example, the terminal block 600 can undergo a plating operation to achieve a second plating that differs from the first plating. The second plating can be a nickel plating, such as an electroless nickel plating or some other plating. The terminal block 600 can remain unplated. Because the terminal block 600 can include a plating (or an absence of plating) that differs from a plating (or an absence of plating) of the busbar 405, the plating for each of the terminal block 600 and the busbar 405 can be independently selected to optimize for various parameters, such as electrical conductivity, weld adhesion, thermal characteristics, or some other parameter.

The terminal block 600 can be coupled with the busbar 405 such that a corner 720 is formed. For example, the terminal block 600 and the busbar 405 can define the corner

720, where the corner 720 can be a sharp corner. The corner can be a 90° corner or a corner having some other angle (e.g., 80°, 70°, 60°, or some other angle). Because the busbar 405 and the terminal block 600 can be separate components, the terminal block 600 can be coupled with the busbar 405 at the interface 700. For example, a side of the terminal block 600 can abut the surface 725 of the busbar 405 to create the interface 700, where the abutting of the terminal block 600 and the busbar 405 forms the corner 720.

Figure 9:
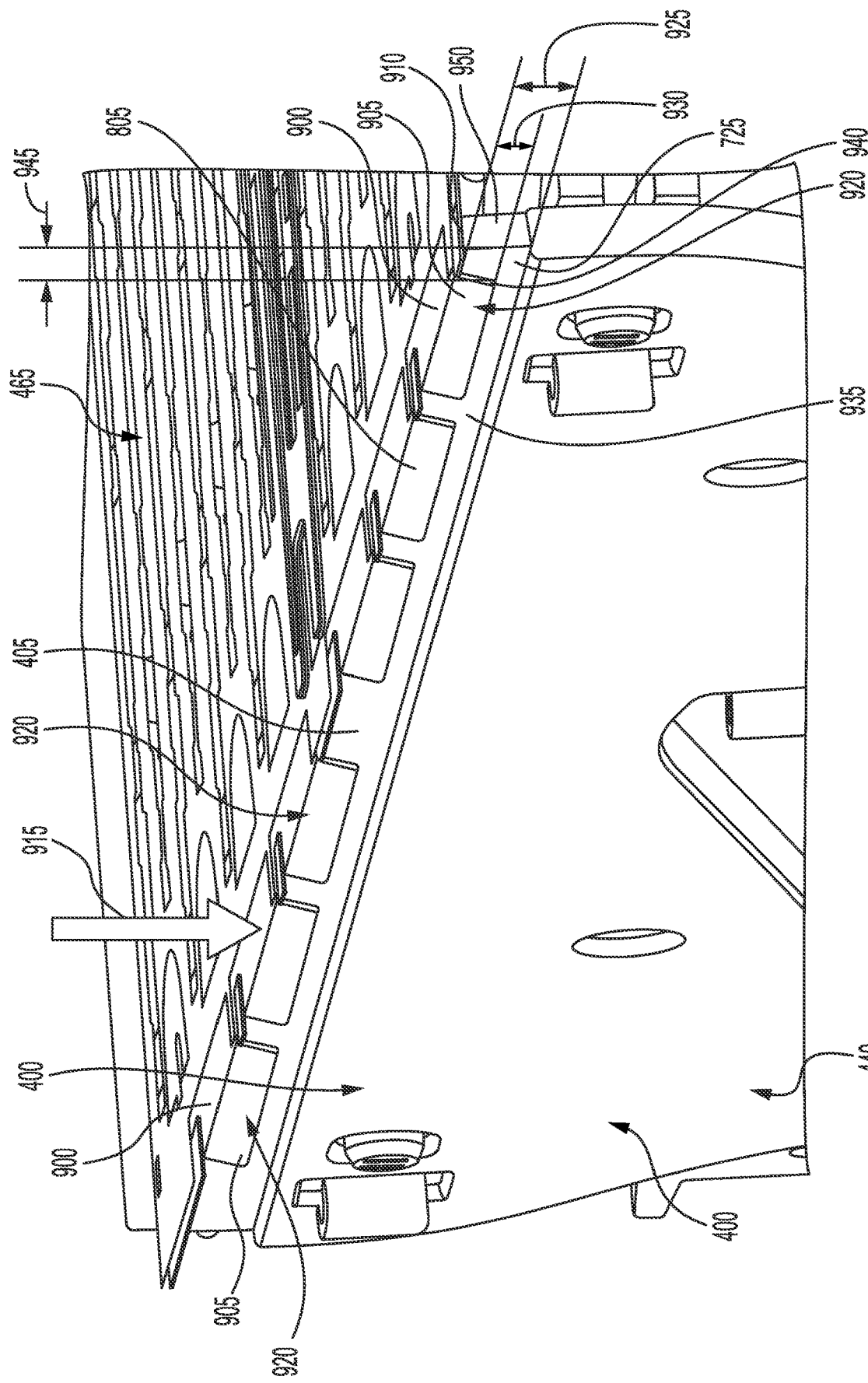
FIG. 9 depicts an example current collector, in accordance with some aspects.
Figure 10:
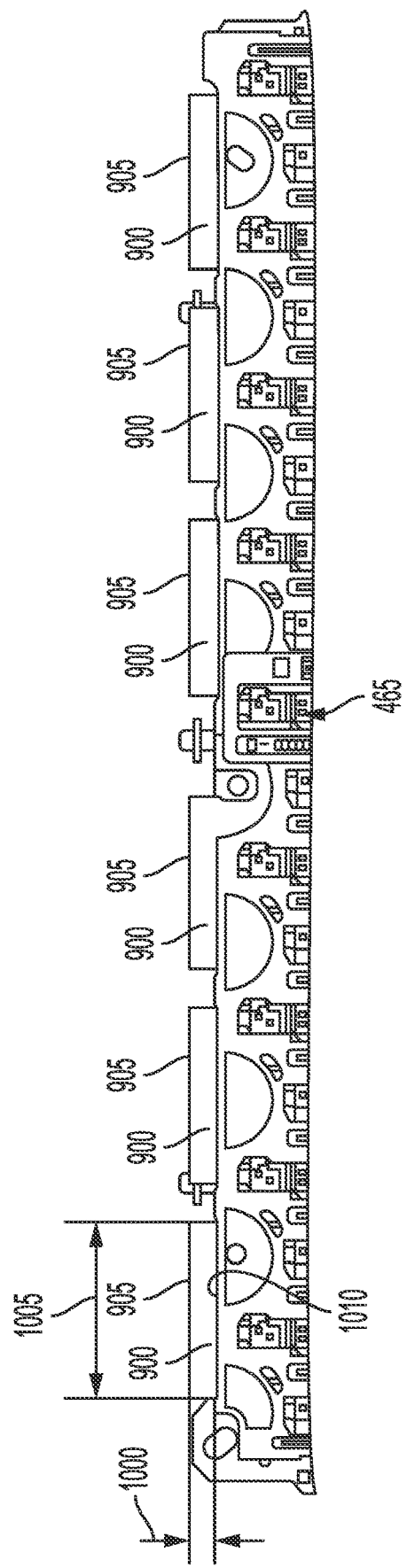
FIG. 10 depicts an example terminal block of a busbar assembly, in accordance with some aspects.

As depicted in FIGS. 9 and 10, among others, the busbar 405 can be coupled with the current collector 465. For example, the busbar 405 can be electrically coupled with the current collector 465. The current collector 465 can include a tab 920. The tab 920 can be an electrically conductive member or portion of the current collector 465 that can extend over an edge 910 of the busbar 405. For example, and as discussed above, the busbar 405 can be coupled with the cell carrier 430. The busbar 405 can specifically be coupled with a side of the cell carrier 430 such that the edge 910 of the busbar 405 is positioned at or near (e.g., within once centimeter) of an upper or lower plane of the cell carrier 430. The current collector 465 can be positioned the top or bottom of the cell carrier 430 to electrically couple with each of the battery cells 120 within the submodule 300 or the submodule 305 or within the cell carrier 430 (e.g., tote, battery tote, battery module tote). For example, the current collector 465 can be positioned on or within an upper or lower plane of the cell carrier 430 with the busbar 405 positioned on a side of the cell carrier 430 with the edge 910 of the busbar 405 positioned at or near the same upper or lower plane of the cell carrier 430. The current collector 465 can include the tab 920 to extend at a length 1000 from the current collector 465. For example, the tab 920 can extend from an edge 1010 of the current collector at the length 1000. The tab 920 can have a width 1005. The tab 920 can include a first portion 900 and a second portion 905. The first portion 900 can be a proximal portion of the tab 920 positioned near (e.g., at or within one inch of) the edge 1010 of the current collector 465. The second portion 905 can be a distal portion of the tab 920. For example, the second portion 905 can be an outermost portion of the tab 920. The length 1000 of the tab 920 and the width 1005 of the tab 920 can be dimensionally optimized to maximize a surface area of the tab 920 that can be available for electrically coupling the tab 920 with the busbar 405.

The tab 920 can extend from the current collector 465 at the length 1000 such that the tab 920 can contact the edge 910 of the busbar 405. The edge 910 of the busbar 405 can be an exposed portion of the busbar 405 that can electrically couple with the tab 920 of the current collector 465. For example, the edge 910 of the busbar 405 can be a portion of the busbar 405 not overmolded with the overmold member 440. Because the edge 910 is not overmolded with the overmold member 440, the edge 910 can facilitate electrical coupling between the busbar 405 and the tab 920 of the current collector 465. For example, the tab 920 can extend from the edge 1010 of the current collector 465 and over at least a portion of the edge 910 of the busbar 405. The tab 920 can extend over (e.g., beyond) the edge 910 of the busbar 405). The current collector 465 can be electrically coupled with the busbar 405 via contact between the tab 920 and the edge 910 of the busbar 405. For example, the current collector 465 can be electrically coupled with the busbar 405 via contact between the first portion 900 of the tab 920 and the edge 910 of the busbar 910. The first portion 900 of the tab 920 can be welded (e.g., laser welded) with the edge 910 of the busbar 405 to electrically couple the busbar 405 with the tab 920. For example, a laser welding device or some other laser-emitting element can emit (e.g., direct, shoot, aim) a laser beam in the direction 915 (e.g., a downwards direction) onto the first portion 900 with the first portion 900 positioned on the edge 910 of the busbar 405. The laser welding device can, for example, emit a laser beam in the direction 915 to cause at least a portion of the tab 920 (e.g., the first portion 900) and at least a portion of the busbar 405 (e.g., the edge 910) to melt, meld, or otherwise combine. For example, the laser welding device can emit a laser beam in the direction 915 to create a welded joint between the tab 920 and the busbar 405 to electrically couple the tab 920 with the busbar 405. As depicted in FIGS. 9 and 10, among others, the current collector 465 can include multiple tabs 920, each of which can be coupled (e.g., via a laser welding operation) with the edge 910 of the busbar 405 to electrically couple the current collector 465 with the busbar 405. The tab 920 can be coupled with the edge 910 of the busbar 405 via some other operation, such as ultrasonic welding, friction welding, electrically conductive adhesive, or some other joining operation, for example.

The current collector 465 can include the tab 920 to fold over the edge 910 of the busbar 405. For example, the current collector 465 can include the tab 920 extending for the length 1000 such that the tab 920 extends beyond the edge 910 of the busbar 405. The tab 920 can extend beyond the edge 910 of the busbar 405 such that the tab 920 can extend for a length 930 along a face 935 of the busbar 405. For example, the second portion 905 of the tab 920 can fold over the edge 910 and along the face 935 of the busbar 405. The face 935 of the busbar 405 can be a portion of the outer surface 725 of the busbar 405 that is exposed (e.g., not overmolded with the overmold member 440). For example, the face 935 of the busbar 405 can be an exposed, electrically conductive portion of the busbar 405. The face 935 can include a height 925. The height 925 can be a distance from the overmold member 440 to the edge 910 of the busbar 405. For example, the height 925 can be a height of the busbar 405 that is not overmolded with the overmold member 440. The tab 920 (e.g., the second portion 905 of the tab 920) can extend for the length 930 along the face 935 of the busbar 405 with the tab 920 folded over the edge 910 of the busbar 405. For example, the tab 920 can extend for the length 930 along the face 935 of the busbar, where the length 930 is at least 50% of the height 925 of the face 935. The tab 920 can fold over the edge 910 and extend for the length 930 along the face 935 with the tab 920 electrically coupled with the edge 910 of the busbar. The second portion 905 of the tab 920 can be electrically coupled with the face 935 of the busbar 405. For example, the second portion 905 can be welded or otherwise joined with the face 935. The second portion 905 can fold over the edge 910 and along the face 935 without being mechanically or electrically coupled with the face 935. For example, the second portion 905 can fold over the edge 910 or be capable of folding over the edge 910, but can remain uncoupled with the face 935. The length 930 for which the tab 920 extends along the face 935 can be a length 930 the tab 920 would extend along the face 935 if the tab 920 (e.g., the second portion 905) were positioned against (e.g., abutting) the face 935.

The current collector 465 can include a tab edge 940 positioned a distance 945 from a side 950 of the busbar 405. For example, the current collector 465 can include an outermost tab 920. The outermost tab 920 can be a tab 920 positioned closest (among the various tabs 920 of the current collector 465) to the side 950 of the busbar 405. The outermost tab 920 can include the tab edge 940 positioned parallel or at least partially parallel with the side 950 of the busbar 405. For example, the side 950 of the busbar 405 can be a surface of the busbar 405 positioned perpendicular or at least partially perpendicular to the face 935 of the busbar 405. The tab edge 940 of the outermost tab 920 can be positioned the distance 945 from the side 950 of the busbar 405, where the distance 945 can be less than once centimeter, less than eight millimeters, 7.4 millimeters, or some other distance. For example, the distance 945 can be a relatively small distance (e.g., less than thirty millimeters) because the tab 920 can include the width 1005 sufficient to cover a substantial proportion (e.g., more than 80%) of the surface area of the edge 910 of the busbar 405. The distance 945 can be 7.4 millimeters, less than 7.4 millimeters, or more than 7.4 millimeters.

Figure 11:
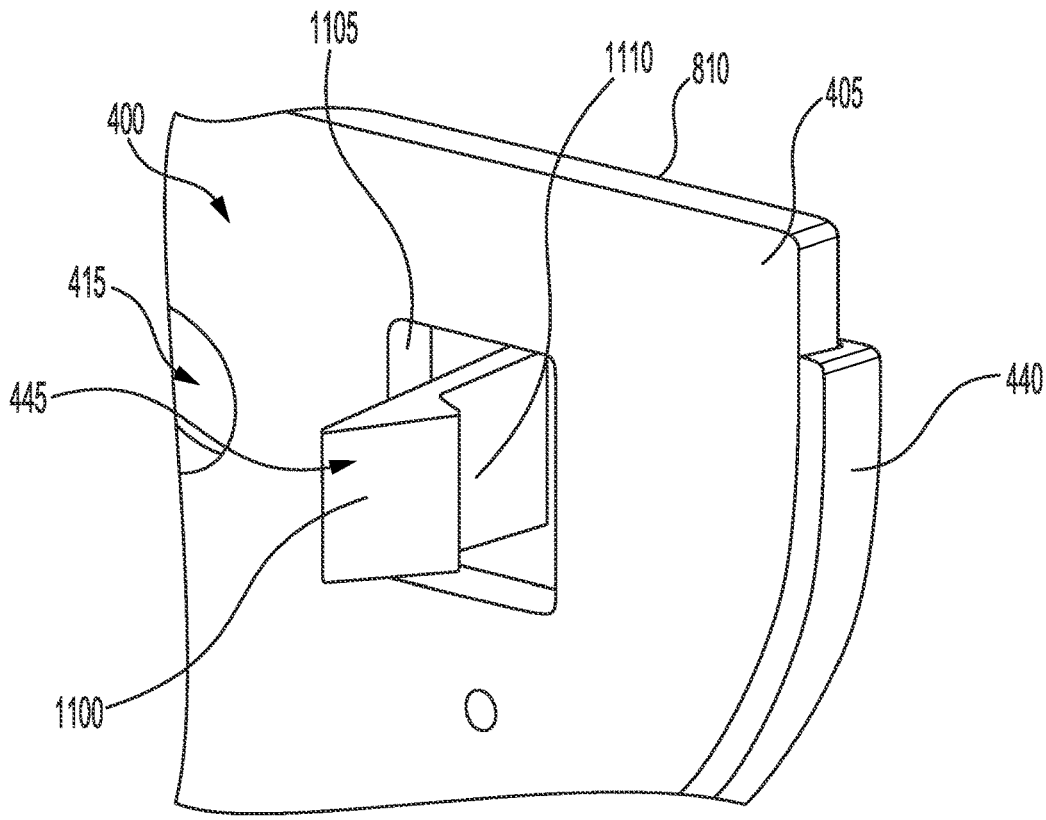
FIG. 11 depicts an example terminal block of a busbar assembly, in accordance with some aspects.
Figure 12:
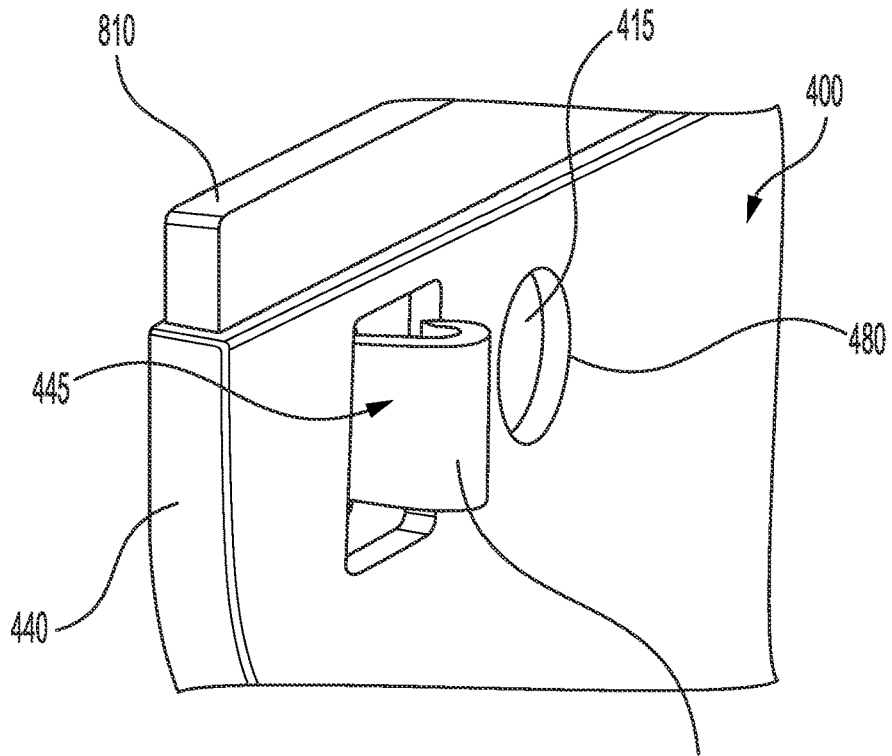
FIG. 12 depicts an example retention arm of a busbar assembly, in accordance with some aspects.
Figure 13:
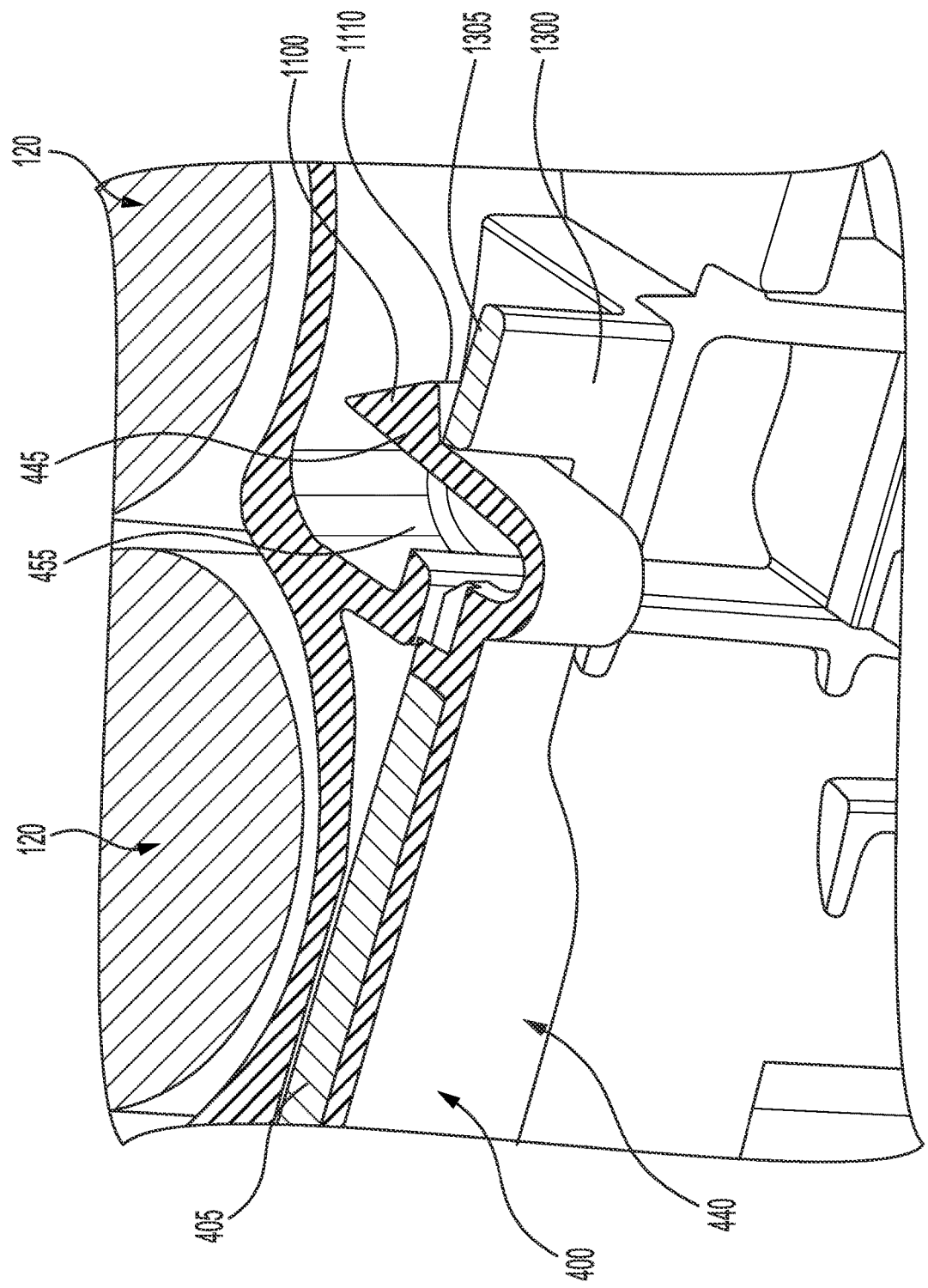
FIG. 13 depicts an example retention arm of a busbar assembly, in accordance with some aspects.

As depicted in FIGS. 11-13, the overmold member 440 can include the retention arm 445 (e.g., the locating arm 445) to engage with the cell carrier 430 to couple the busbar 405 with the cell carrier 430. For example, the busbar 405 can be coupled with the overmold member 440, and the retention arm 445 of the overmold member 440 can engage with the cell carrier 430 to couple the busbar 405 and the overmold member 440 to the cell carrier 430. The retention arm 445 can include a tip 1100 (e.g., an end 1100, a distal end 1100) that can be inserted into the opening 455 of the cell carrier 430. For example, the retention arm 445 can extend from the overmold member 440 and towards the cell carrier 430 with the busbar 405 positioned between the overmold member 440 and the cell carrier 430. The retention arm 445 can extend around (e.g., around an outside of) the busbar 405. The retention arm 445 can extend through an opening 1105 (e.g., a retention arm opening 1105) of the busbar 405. For example, as depicted in FIG. 12, the retention arm 445 can include the tip 1100 extending through the opening 1105 of the busbar 405 before ultimately engaging with the opening 455 of the cell carrier 430. The retention arm 445 can include a first portion 1200 (e.g., a proximal end 1200). The first portion 1200 can extend from the overmold member 440 in a direction opposite or different than a direction in which the tip 1100 extends. For example, the first portion 1200 can extend from the overmold member 440 away from the cell carrier 430 or away from the busbar 405 with the busbar 405 positioned between the overmold member 440 and the cell carrier 430. The first portion 1200 can be a looped or curved portion of the retention arm 445 extending from an outer surface of the overmold member 440.

The retention arm 445 can include a retaining portion 1110. The retention portion 1110 can be a protrusion, sharp edge, raised edge, or other feature extending from the retention arm 445 proximate (e.g., within one inch, within one centimeter, or some other length) the tip 1100. The retention portion 1110 can be tapered. For example, the retention portion 1110 can be tapered down towards the tip 1100 of the retention arm 445. The retention portion 1110 can extend from the retention arm 445 to engage with a wall 1400 of the cell carrier 430. For example, the wall 1400 can be a wall that at least partially defines the opening 455 of the cell carrier 430. As depicted in FIG. 13, among others, the retention portion 1110 can extend from the retention arm 445 to engage with a back surface 1305 of the wall 1300. The engagement (e.g., contact) between the retention portion 1110 and the wall 1300 can at least partially prevent the retention arm 445 from being removed from or disengaged with the opening 455 of the cell carrier 430. For example, the engagement between the retaining portion and the wall 1300 can at least partially prevent the overmold member 440 from being separated from the cell carrier 430. The retention portion 1110 of the retention arm 445 of the overmold member 440 can engage with the opening 455 of the cell carrier 430 with the busbar 405 positioned at least partially between the overmold member 440 and the cell carrier 430. For example, the retention portion 1110 of the retention arm 445 of the overmold member 440 can engage with the opening 455 of the cell carrier 430 to retain the busbar 405 and the overmold member 440 to (e.g., against) the cell carrier 430.

The retention arm 445 can be flexible or can include at least some amount of elasticity. For example, the retention arm 445 can be or include a polymeric material (e.g., a polymeric material used to mold an entirety of the overmold member 440). The retention arm 445 can bend slightly to facilitate the engagement or disengagement of the retention arm 445 with the opening 455 of the cell carrier 430. For example, the retention arm 445 can bend or flex to allow the retention arm 445 to pass into or pass out of the opening 455 in a manner substantially uninhibited (e.g., at least 50% uninhibited) or substantially unobstructed (e.g., at least 50% unobstructed) by an engagement between the retention portion 1110 and the wall 1400 of the opening 455. The retention arm 445 can flex as the tip 1100 is inserted into the opening 455. The retention member can spring outwards (e.g., in a direction towards the wall 1400) once the retention portion 1110 moves past the wall 1400. The retention arm 445 can be depressed or flexed inwards (e.g., away from the wall 1400) to disengage the retention portion 1110 from the wall 1400 to allow the retention portion 1110 and the tip 1100 to pass out of the opening 455. For example, the retention arm 445 can be flexed to disengage the retention arm 445 from the opening 455 of the cell carrier 430.

The retention arm 445 can detachably couple the busbar 405 and the overmold member 440 with the cell carrier 430. For example, the retention arm 445 can engage the opening 455 of the cell carrier 430 to position the busbar 405 and overmold member 440 relative to the cell carrier 430. The protrusion 435 of the cell carrier 430 can undergo a heat staking operation (e.g., experience localized heat) to form the end portion 605 on the protrusion 435 to rigidly couple the busbar 405 and overmold member 440 with the cell carrier 430. For example, the retention arm 445 can engage the opening 455 of the cell carrier 430 while the first datum locator 425 engages the first datum locator opening 410 and while the second datum locator 427 engages the second datum locator opening 415 to detachably (e.g., temporarily) position the busbar 405 and overmold member 440 against the cell carrier 430. The protrusion 435 of the cell carrier 430 can undergo a heat staking operation (e.g., experience localized heat) to form the end portion 605 on the protrusion 435 to rigidly couple the busbar 405 and overmold member 440 with the cell carrier 430 with the retention arm 445 engaged with the opening 455 of the cell carrier 430, the first datum locator 425 engaged with the first datum locator opening 410, and the second datum locator 427 engaged with the second datum locator opening 415. The retention arm 445 (e.g., the locating arm 445) can facilitate the proper positioning of the overmold member 440 and the busbar 405 against the cell carrier 430. For example, even without the first datum locator 425 or the second datum locator 427, the engagement of the retention arm 445 with the opening 455 of the cell carrier 430 can at least partially align the busbar 405 and the overmold member 440 against the cell carrier 430. The at least partial alignment of the busbar 405 and the overmold member 440 with the cell carrier 430 can include an alignment of the edge 910 of the busbar 405 with the tab 920 of the current collector 465, for example. The at least partial alignment of the busbar 405 and the overmold member 440 with the cell carrier 430 can include an alignment of the protrusion 435 of the cell carrier 430 with the opening 420 of the busbar 405 to facilitate the heat staking or coupling of the busbar 405 with the cell carrier 430.

Figure 14:
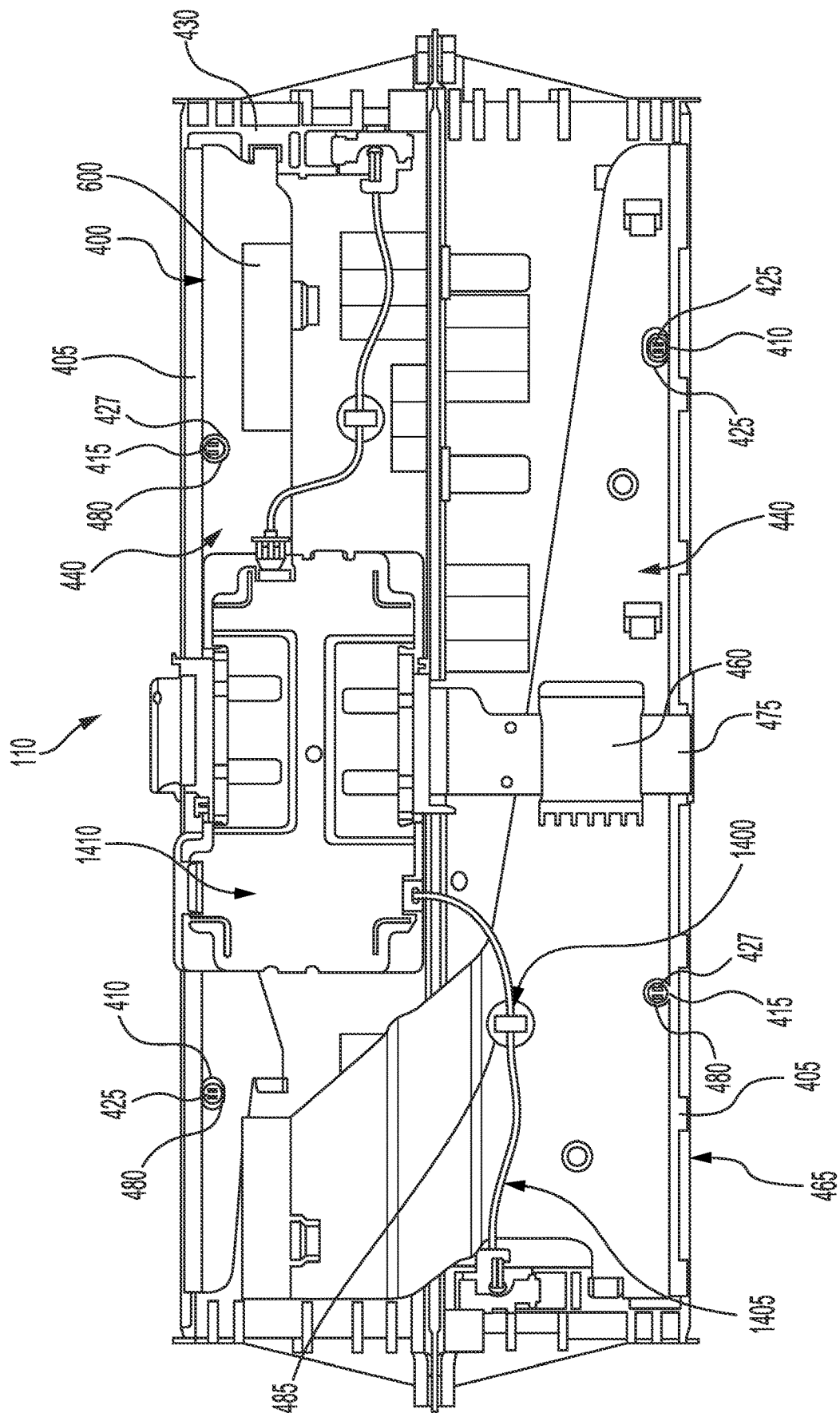
FIG. 14 depicts an example retention arm of a busbar assembly, in accordance with some aspects.
Figure 15:
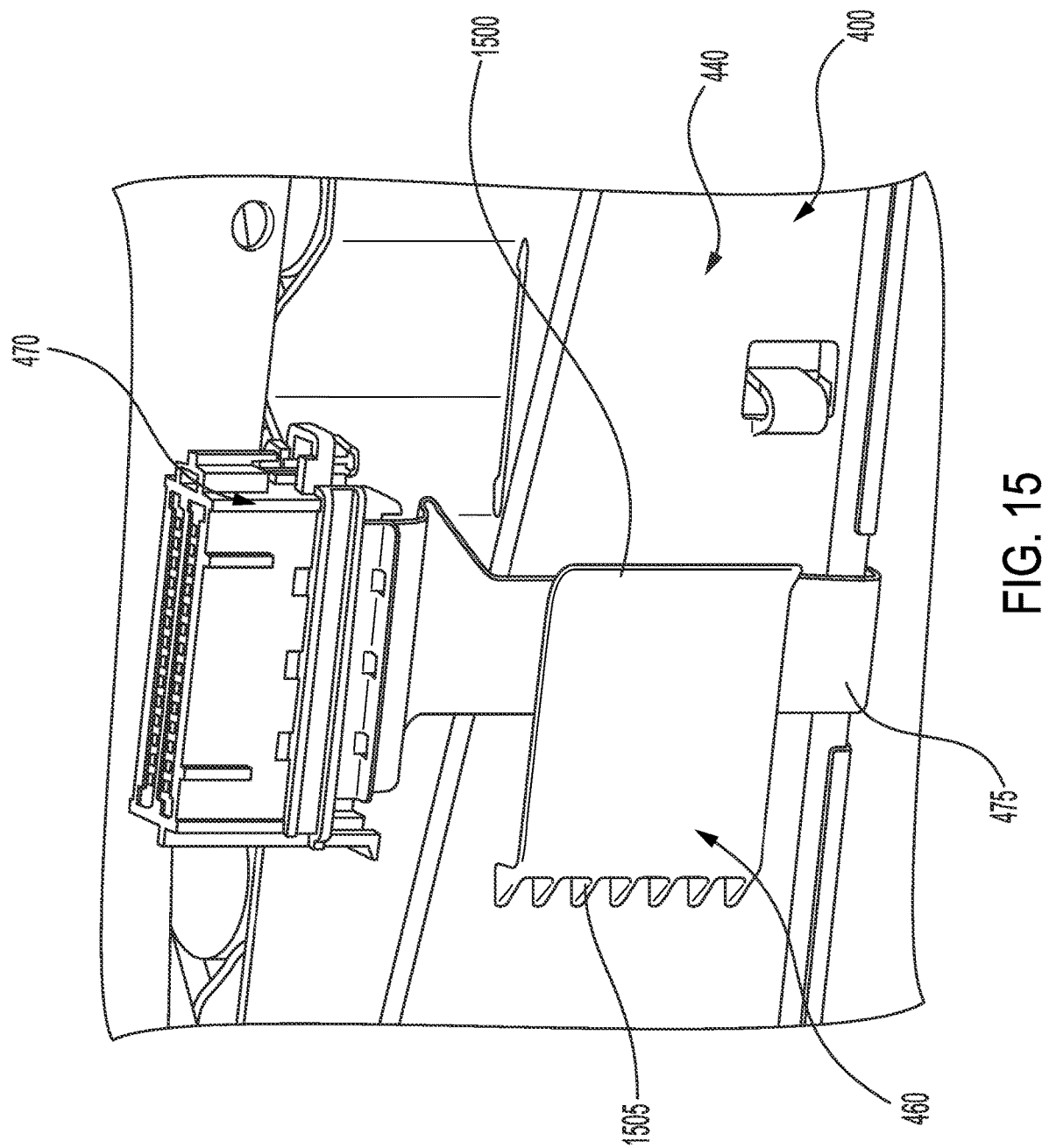
FIG. 15 is a detail view of an example busbar assembly, in accordance with some aspects.

As depicted in FIG. 4, and as shown in detail in FIGS. 14 and 15, the busbar assembly 400 can include a retention clip 460. The retention clip 460 can be integrally formed with the overmold member 440. For example, the retention clip 460 can be part of or integrally molded with the overmold member 440. The retention clip 460 can be a separate component coupled with the overmold member 440. The retention clip can retain a cable 475, such as a ribbon cable 475. The cable 475 can include a connector 470. The connector 470 can facilitate electrical connection of the cable 475 with another object, such as a battery voltage temperature monitor 1410 ("BVT" 1410) depicted in FIG. 14. For example, the cable 475 can be a cable associate with a voltage monitor, such as a voltage sensing harness (VSH) that can monitor a voltage of the submodule 300 or the submodule 305. For example, the VSH can be coupled with the current collector 465 and can include at least one voltage sensor to measure a voltage of the current collector 465 with the current collector 465 coupled with the battery cells 120. The BVT 1410 can be a monitor, module, controller, or other device. The BVT 1410 can be coupled with the cell carrier 430, the busbar assembly 400, or some other component of the battery pack 110. For example, the BVT 1410 can monitor a voltage of the submodule 300, the submodule 305, or both the submodule 300 and the submodule 305 via a VSH coupled with the relevant current collector 465. The BVT 1410 can monitor voltage based on data or information provided by the VSH via the cable 475 and the connector 470.

As depicted in FIG. 15, among others, the overmold member 440 can include the retention clip 460 to retain the cable 475 against the overmold member 440. For example, the retention clip 460 can include a first end 1500 and a second end 1505. The first end 1500 can be a free end 1500 that can be disconnected from the overmold member 440 or selectively engageable with the overmold member 440. For example, the first end 1500 can contact the overmold member 440 via a spring force of the retention clip 460 (e.g., a biasing force keeping the first end 1500 against the overmold member 440). The first end 1500 can be selectively separated from the overmold member 440 to allow an object—such as the cable 475—to pass between the first end 1500 and the overmold member 440. The first end 1500 can be secured against the overmold member 440. For example, the first end 1500 can be fastened, clipped, or otherwise coupled with the overmold member 440. The first end 1500 can then be unfastened, unclipped, or released from the overmold member 440 to allow an object—such as the cable 475—to pass between the first end 1500 and the overmold member 440. The second end 1505 of the retention clip 1505 can be coupled with the overmold member 440. For example, the second end 1505 can be integrally molded with the overmold member 440. The second end 1505 can be rigidly coupled with the overmold member 440. The second end 1505 can be pivotally coupled with the overmold member 440 such that the retention clip 460 can rotate about the second end 1505 to allow an object—such as the cable 475—to pass between the retention clip 460 and the overmold member 440.

The retention clip 460 can retain the cable 475 against the overmold member 440. For example, the retention clip 460 can include the first end 1500 and the second end 1505 of the retention clip 460 to apply a force against the cable 475 to cause the cable 475 to be pressed against the overmold member 440. The retention clip 460 can include the first end 1500 and the second end 1505 of the retention clip 460 prevent the cable 475 from separating from the overmold member 440. For example, the retention clip 460 can include the first end 1500 and the second end 1505 of the retention clip 460 to prevent the cable 475 from separating from the overmold member 440 by more than some distance (e.g., one centimeter, one inch)

Figure 16:
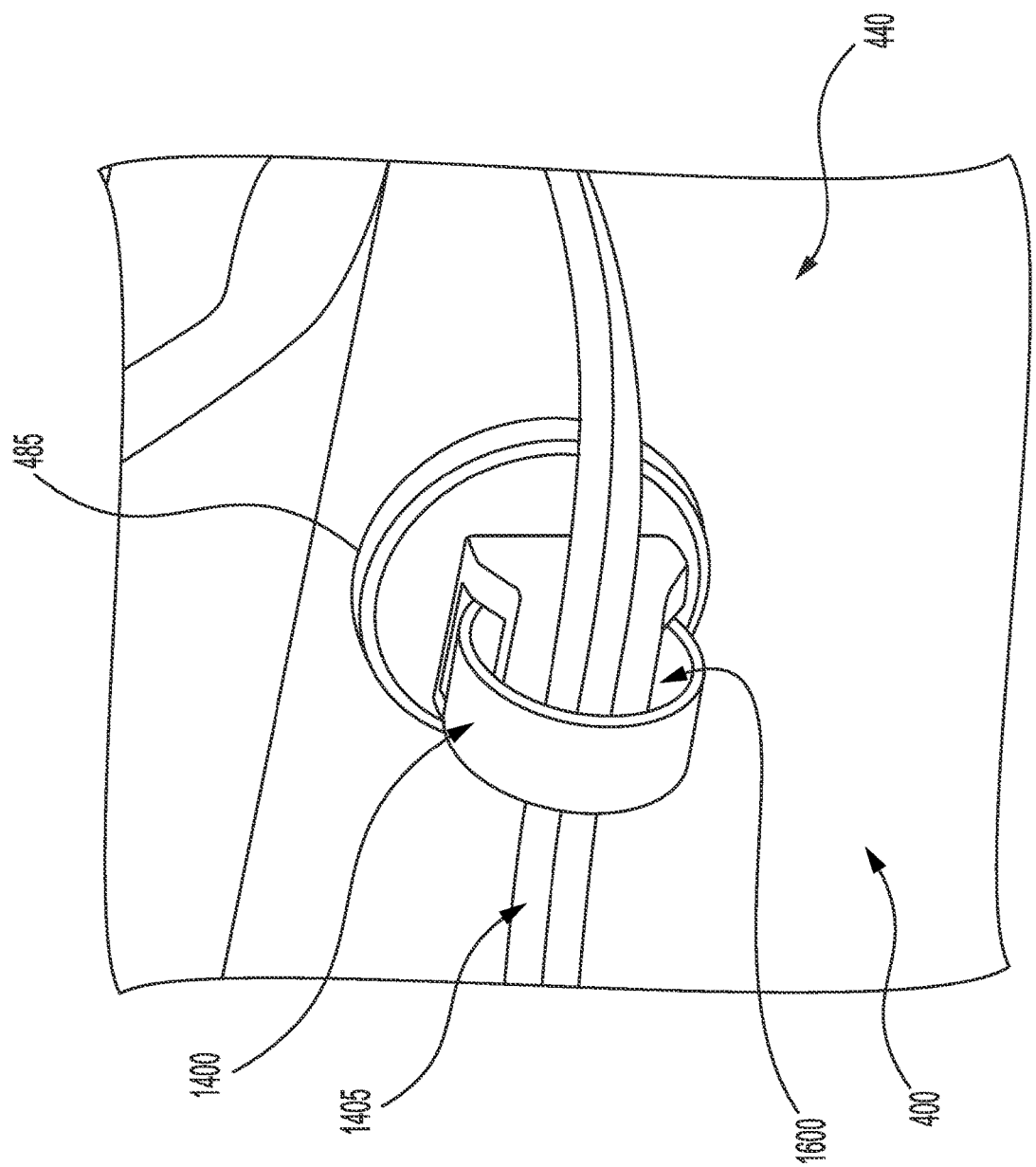
FIG. 16 depicts an example retention clip of a busbar assembly, in accordance with some aspects.

The BVT 1410 can monitor a temperature of the submodule 300, the submodule 305, both the submodule 300 and the submodule 305, or some other component of the battery pack 110. For example, as depicted in FIG. 14, a cable 1405 can be coupled with the BVT 1410 to provide a data or information regarding a temperature measurement to the BVT 1410. The cable 1405 can be a thermistor cable 1405. As depicted in FIGS. 4, 14, and 16, the busbar assembly 400 can include at least one retention member 1400 coupled with a mounting feature 485 of the overmold member 440. The overmold member 440 can include the mounting feature 485 to which the retention member 1400 can be coupled. For example, the mounting feature 485 can be a protrusion, boss, or raised surface of the overmold member 440. The mounting feature 485 can be a recess, indentation, or depressed surface of the overmold member 440. The mounting feature 485 can be or include one or more raised edges. The mounting feature 485 can include at least one opening (e.g., aperture, recess, hole, threaded hole or other feature). For example, the mounting feature 485 can include a threaded hole or threaded post to which the retention member 1400 can be coupled. The mounting feature 485 can be integrally molded with the overmold member 440. The mounting feature 485 can be a separate component coupled to the overmold member 440.

The retention member 1400 can be a clip, loop, clasp, or other retention feature that can retain the cable 1405. For example, the overmold member 440 can be coupled with the retention member 1400 such that the retention member 1400 can retain the cable 1405 against the overmold member 440. As depicted in FIG. 16, among others, the retention member 1400 can be a clip or loop that can define an opening 1600. The cable 1405 can be received in the opening 1600. For example, the cable 1405 can be received in the opening 1600 such that the retention member 1400 at least partially surrounds the cable 1405. The retention member 1400 can completely surround the cable 1405 with the cable 1405 positioned within the opening 1600. The cable 1405 can be retained against the overmold member 440 with the cable 1405 within the opening 1600 of the retention member 1400. For example, the cable 1405 can be prevented or substantially prevented (e.g., at least 95% prevented) from separating from the overmold member 440 or the busbar assembly 400. The cable 1405 can pass through the opening 1600 to retain the cable 1405 against the overmold member 440 such that the cable 1405 is less likely to be snagged, pulled, tugged, or otherwise damaged. The retention member 1400 can be integrally formed with the overmold member 440 or can be a separate component that can be coupled with the overmold member 440.

As depicted in FIGS. 17-19, among others, the battery cell 120 can have a variety of form factors, shapes, or sizes. For example, battery cells 120 can have a cylindrical, rectangular, square, cubic, flat, pouch, elongated or prismatic form factor. As depicted in FIG. 17, for example, the battery cell 120 can be cylindrical. As depicted in FIG. 18, for example, the battery cell 120 can be prismatic. As depicted in FIG. 19, for example, the battery cell 120 can include a pouch form factor. Battery cells 120 can be assembled, for example, by inserting a winded or stacked electrode roll (e.g., a jelly roll) including electrolyte material into at least one battery cell housing 1700. The electrolyte material, e.g., an ionically conductive fluid or other material, can support electrochemical reactions at the electrodes to generate, store, or provide electric power for the battery cell by allowing for the conduction of ions between a positive electrode and a negative electrode. The battery cell 120 can include an electrolyte layer where the electrolyte layer can be or include solid electrolyte material that can conduct ions. For example, the solid electrolyte layer can conduct ions without receiving a separate liquid electrolyte material. The electrolyte material, e.g., an ionically conductive fluid or other material, can support conduction of ions between electrodes to generate or provide electric power for the battery cell 120. The housing 1700 can be of various shapes, including cylindrical or rectangular, for example. Electrical connections can be made between the electrolyte material and components of the battery cell 120. For example, electrical connections to the electrodes with at least some of the electrolyte material can be formed at two points or areas of the battery cell 120, for example to form a first polarity terminal 1705 (e.g., a positive or anode terminal) and a second polarity terminal 1710 (e.g., a negative or cathode terminal). The polarity terminals can be made from electrically conductive materials to carry electrical current from the battery cell 120 to an electrical load, such as a component or system of the electric vehicle 105.

For example, the battery cell 120 can include at least one lithium-ion battery cell. In lithium-ion battery cells, lithium ions can transfer between a positive electrode and a negative electrode during charging and discharging of the battery cell. For example, the battery cell anode can include lithium or graphite, and the battery cell cathode can include a lithium-based oxide material. The electrolyte material can be disposed in the battery cell 120 to separate the anode and cathode from each other and to facilitate transfer of lithium ions between the anode and cathode. It should be noted that battery cell 120 can also take the form of a solid state battery cell developed using solid electrodes and solid electrolytes. Solid electrodes or electrolytes can be or include inorganic solid electrolyte materials (e.g., oxides, sulfides, phosphides, ceramics), solid polymer electrolyte materials, hybrid solid state electrolytes, or combinations thereof. In some embodiments, the solid electrolyte layer can include polyanionic or oxide-based electrolyte material (e.g., Lithium Superionic Conductors (LISICONs), Sodium Superionic Conductors (NASICONs), perovskites with formula $ABO_3$ (A=Li, Ca, Sr, La, and B=Al, Ti), garnet-type with formula $A_3B_2(XO_4)_3$ (A=Ca, Sr, Ba and X=Nb, Ta), lithium phosphorous oxynitride ($Li_xPO_yN_2$). In some embodiments, the solid electrolyte layer can include a glassy, ceramic and/or crystalline sulfide-based electrolyte (e.g., $Li_3PS_4$, $Li_7P_3S_{11}$, $Li_2S$—$P_2S_5$, $Li_2S$—$B_2S_3$, SnS—$P_2S_5$, $Li_2S$—$SiS_2$, $Li_2S$—$P_2S_5$, $Li_2S$—$GeS_2$, $Li_{10}GeP_2S_{12}$) and/or sulfide-based lithium argyrodites with formula $Li_6PS_5X$ (X=Cl, Br) like $Li_6PS_5Cl$). Furthermore, the solid electrolyte layer can include a polymer electrolyte material (e.g., a hybrid or pseudo-solid state electrolyte), for example, polyacrylonitrile (PAN), polyethylene oxide (PEO), polymethyl-methacrylate (PMMA), and polyvinylidene fluoride (PVDF), among others.

The battery cell 120 can be included in battery modules 115 or battery packs 110 to power components of the electric vehicle 105. The battery cell housing 1700 can be disposed in the battery module 115, the battery pack 110, or a battery array installed in the electric vehicle 105. The housing 1700 can be of any shape, such as cylindrical with a circular (e.g., as depicted in FIG. 17, among others), elliptical, or ovular base, among others. The shape of the housing 1700 can also be prismatic with a polygonal base, as shown in FIG. 18, among others. As shown in FIG. 19, among others, the housing 1700 can include a pouch form factor. The housing 1700 can include other form factors, such as a triangle, a square, a rectangle, a pentagon, and a hexagon, among others. In some embodiments, the battery pack may not include modules (e.g., module-free). For example, the battery pack can have a module-free or cell-to-pack configuration where the battery cells are arranged directly into a battery pack without assembly into a module.

The housing 1700 of the battery cell 120 can include one or more materials with various electrical conductivity or thermal conductivity, or a combination thereof. The electrically conductive and thermally conductive material for the housing 1700 of the battery cell 120 can include a metallic material, such as aluminum, an aluminum alloy with copper, silicon, tin, magnesium, manganese, or zinc (e.g., aluminum 1000, 4000, or 5000 series), iron, an iron-carbon alloy (e.g., steel), silver, nickel, copper, and a copper alloy, among others. The electrically insulative and thermally conductive material for the housing 1700 of the battery cell 120 can include a ceramic material (e.g., silicon nitride, silicon carbide, titanium carbide, zirconium dioxide, beryllium oxide, and among others) and a thermoplastic material (e.g., polyethylene, polypropylene, polystyrene, polyvinyl chloride, or nylon), among others. In examples where the housing 1700 of the battery cell 120 is prismatic (e.g., as depicted in FIG. 18, among others) or cylindrical (e.g., as depicted in FIG. 17, among others), the housing 1700 can include a rigid or semi-rigid material such that the housing 1700 is rigid or semi-rigid (e.g., not easily deformed or manipulated into another shape or form factor). In examples where the housing 1700 includes a pouch form factor (e.g., as depicted in FIG. 19, among others), the housing 1700 can include a flexible, malleable, or non-rigid material such that the housing 1700 can be bent, deformed, manipulated into another form factor or shape.

The battery cell 120 can include at least one anode layer 1715, which can be disposed within the cavity 1720 defined by the housing 1700. The anode layer 1715 can include a first redox potential. The anode layer 1715 can receive electrical current into the battery cell 120 and output electrons during the operation of the battery cell 120 (e.g., charging or discharging of the battery cell 120). The anode layer 1715 can include an active substance. The active substance can include, for example, an activated carbon or a material infused with conductive materials (e.g., artificial or natural graphite, or blended), lithium titanate ($Li_4Ti_5O_{12}$), or a silicon-based material (e.g., silicon metal, oxide, carbide, pre-lithiated), or other lithium alloy anodes (Li—Mg, Li—Al, Li—Ag alloy etc.) or composite anodes consisting of lithium and carbon, silicon and carbon or other compounds. The active substance can include graphitic carbon (e.g., ordered or disordered carbon with $sp^2$ hybridization), Li metal anode, or a silicon-based carbon composite anode, or other lithium alloy anodes (Li—Mg, Li—Al, Li—Ag alloy etc.) or composite anodes consisting of lithium and carbon, silicon and carbon or other compounds. In some examples, an anode material can be formed within a current collector material. For example, an electrode can include a current collector (e.g., a copper foil) with an in situ-formed anode (e.g., Li metal) on a surface of the current collector facing the separator or solid-state electrolyte. In such examples, the assembled cell does not comprise an anode active material in an uncharged state.

The battery cell 120 can include at least one cathode layer 1725 (e.g., a composite cathode layer compound cathode layer, a compound cathode, a composite cathode, or a cathode). The cathode layer 1725 can include a second redox potential that can be different than the first redox potential of the anode layer 1715. The cathode layer 1725 can be disposed within the cavity 1720. The cathode layer 1725 can output electrical current out from the battery cell 120 and can receive electrons during the discharging of the battery cell 120. The cathode layer 1725 can also receive lithium ions during the discharging of the battery cell 120. Conversely, the cathode layer 1725 can receive electrical current into the battery cell 120 and can output electrons during the charging of the battery cell 120. The cathode layer 1725 can release lithium ions during the charging of the battery cell 120.

The battery cell 120 can include a layer 1730 disposed within the cavity 1720. The layer 1730 can include a solid electrolyte layer. The layer 1730 can include a separator wetted by a liquid electrolyte. The layer 1730 can include a polymeric material. The layer 1730 can include a polymer separator. The layer 1730 can be arranged between the anode layer 1715 and the cathode layer 1725 to separate the anode layer 1715 and the cathode layer 1725. The polymer separator can physically separate the anode and cathode from a cell short circuit. A separator can be wetted with a liquid electrolyte. The liquid electrolyte can be diffused into the anode layer 1715. The liquid electrolyte can be diffused into the cathode layer 1725. The layer 1730 can help transfer ions (e.g., $Li^+$ ions) between the anode layer 1715 and the cathode layer 1725. The layer 1730 can transfer $Li^+$ cations from the anode layer 1715 to the cathode layer 1725 during the discharge operation of the battery cell 120. The layer 1730 can transfer lithium ions from the cathode layer 1725 to the anode layer 1715 during the charge operation of the battery cell 120.

The redox potential of layers (e.g., the first redox potential of the anode layer 1715 or the second redox potential of the cathode layer 1725) can vary based on a chemistry of the respective layer or a chemistry of the battery cell 120. For example, lithium-ion batteries can include an LFP (lithium iron phosphate) chemistry, an LMFP (lithium manganese iron phosphate) chemistry, an NMC (Nickel Manganese Cobalt) chemistry, an NCA (Nickel Cobalt Aluminum) chemistry, an OLO (Over Lithiated Oxide) chemistry, or an LCO (lithium cobalt oxide) chemistry for a cathode layer (e.g., the cathode layer 1725). Lithium-ion batteries can include a graphite chemistry, a silicon-graphite chemistry, or a lithium metal chemistry for the anode layer (e.g., the anode layer 1715).

For example, lithium-ion batteries can include an olivine phosphate ($LiMPO_4$, M=Fc and/or Co and/or Mn and/or Ni)) chemistry, LISICON or NASICON Phosphates ($Li_3M_2(PO_4)_3$ and $LiMPO_4O_x$, M=Ti, V, Mn, Cr, and Zr), for example lithium iron phosphate (LFP), lithium iron manganese phosphate (LMFP), layered oxides ($LiMO_2$, M=Ni and/or Co and/or Mn and/or Fe and/or Al and/or Mg) examples, NMC (Nickel Manganese Cobalt) chemistry, an NCA (Nickel Cobalt Aluminum) chemistry, or an LCO (lithium cobalt oxide) chemistry for a cathode layer, lithium rich layer oxides ($Li_{1+x}M_{1-x}O_2$) (Ni, and/or Mn, and/or Co), (OLO or LMR), spinel ($LiMn_2O_4$) and high voltage spinels ($LiMn_{1.5}Ni_{0.5}O_4$), disordered rock salt, Fluorophosphates $Li_2FePO_4F$ (M=Fe, Co, Ni) and Fluorosulfates $LiMSO_4F$ (M=Co, Ni, Mn) (e.g., the cathode layer 1725). Lithium-ion batteries can include a graphite chemistry, a silicon-graphite chemistry, or a lithium metal chemistry for the anode layer (e.g., the anode layer 1715). For example, a cathode layer having an LFP chemistry can have a redox potential of 3.4 V vs. Li/Lit, while an anode layer having a graphite chemistry can have a 0.2 V vs. $Li/Li^+$ redox potential.

Electrode layers can include anode active material or cathode active material, commonly in addition to a conductive carbon material, a binder, or other additives as a coating on a current collector (metal foil). The chemical composition of the electrode layers can affect the redox potential of the electrode layers. For example, cathode layers (e.g., the cathode layer 1725) can include medium to high-nickel content (50 to 80%, or equal to 80% Ni) lithium transition metal oxide, such as a particulate lithium nickel manganese cobalt oxide ("LiNMC"), a lithium nickel cobalt aluminum oxide ("LiNCA"), a lithium nickel manganese cobalt aluminum oxide ("LiNMCA"), or lithium metal phosphates like lithium iron phosphate ("LFP") and lithium iron manganese phosphate ("LMFP"). Anode layers (e.g., the anode layer 21715) can include conductive carbon materials such as graphite, carbon black, carbon nanotubes, and the like. Anode layers can include Super P carbon black material, Ketjen Black, Acetylene Black, SWCNT, MWCNT, graphite, carbon nanofiber, or graphene, for example.

Electrode layers can also include chemical binding materials (e.g., binders). Binders can include polymeric materials such as polyvinylidenefluoride ("PVDF"), polyvinylpyrrolidone ("PVP"), styrene-butadiene or styrene-butadiene rubber ("SBR"), polytetrafluoroethylene ("PTFE") or carboxymethylcellulose ("CMC"). Binder materials can include agar-agar, alginate, amylose, Arabic gum, carrageenan, caseine, chitosan, cyclodextrines (carbonyl-beta), ethylene propylene diene monomer (EPDM) rubber, gelatine, gellan gum, guar gum, karaya gum, cellulose (natural), pectine, poly(3,4-ethylenedioxythiophene) polystyrene sulfonate (PEDOT-PSS), polyacrylic acid (PAA), poly(m-ethyl acrylate) (PMA), poly(vinyl alcohol) (PVA), poly(vinyl acetate) (PVAc), polyacrylonitrile (PAN), polyisoprene (PIpr), polyaniline (PANi), polyethylene (PE), polyimide (PI), polystyrene (PS), polyurethane (PU), polyvinyl butyral (PVB), polyvinyl pyrrolidone (PVP), starch, styrene butadiene rubber (SBR), tara gum, tragacanth gum, fluorine acrylate (TRD202A), xanthan gum, or mixtures of any two or more thereof.

Current collector materials (e.g., a current collector foil to which an electrode active material is laminated to form a cathode layer or an anode layer) can include a metal material. For example, current collector materials can include aluminum, copper, nickel, titanium, stainless steel, or carbonaceous materials. The current collector material can be formed as a metal foil. For example, the current collector material can be an aluminum (Al) or copper (Cu) foil. The current collector material can be a metal alloy, made of Al, Cu, Ni, Fe, Ti, or combination thereof. The current collector material can be a metal foil coated with a carbon material, such as carbon-coated aluminum foil, carbon-coated copper foil, or other carbon-coated foil material.

The layer 1730 can include or be made of a liquid electrolyte material. For example, the layer 1730 can be or include at least one layer of polymeric material (e.g., polypropylene, polyethylene, or other material) including pores that are wetted (e.g., saturated with, soaked with, receive, are filled with) a liquid electrolyte substance to enable ions to move between electrodes. The liquid electrolyte material can include a lithium salt dissolved in a solvent. The lithium salt for the liquid electrolyte material for the layer 1730 can include, for example, lithium tetrafluoroborate ($LiBF_4$), lithium hexafluorophosphate ($LiPF_6$), and lithium perchlorate ($LiClO_4$), among others. The solvent can include, for example, dimethyl carbonate (DMC), ethylene carbonate (EC), and diethyl carbonate (DEC), among others. Liquid electrolyte is not necessarily disposed near the layer 1730, but the liquid electrolyte can fill the battery cells 120 in many different ways. The layer 1730 can include or be made of a solid electrolyte material, such as a ceramic electrolyte material, polymer electrolyte material, or a glassy electrolyte material, or among others, or any combination thereof.

In some embodiments, the solid electrolyte film can include at least one layer of a solid electrolyte. Solid electrolyte materials of the solid electrolyte layer can include inorganic solid electrolyte materials (e.g., oxides, sulfides, phosphides, ceramics), solid polymer electrolyte materials, hybrid solid state electrolytes, or combinations thereof. In some embodiments, the solid electrolyte layer can include polyanionic or oxide-based electrolyte material (e.g., Lithium Superionic Conductors (LISICONs), Sodium Superionic Conductors (NASICONs), perovskites with formula $ABO_3$ (A=Li, Ca, Sr, La, and B=Al, Ti), garnet-type with formula $A_3B_2(XO_4)_3$ (A=Ca, Sr, Ba and X=Nb, Ta), lithium phosphorous oxy-nitride ($Li_xPO_yN_z$). In some embodiments, the solid electrolyte layer can include a glassy, ceramic and/or crystalline sulfide-based electrolyte (e.g., $Li_3PS_4$, $Li_7P_3S_{11}$, $Li_2S-P_2S_3$, $Li_2S-B_2S_3$, $SnS-P_2S_5$, $Li_2S-SiS_2$, $Li_2S-P_2S_5$, $Li_2S-GeS_2$, $Li_{10}GeP_2S_{12}$) and/or sulfide-based lithium argyrodites with formula $Li_6PS_5X$ (X=Cl, Br) like $Li_6PS_5Cl$). Furthermore, the solid electrolyte layer can include a polymer electrolyte material (e.g., a hybrid or pseudo-solid state electrolyte), for example, polyacrylonitrile (PAN), polyethylene oxide (PEO), polymethyl-methacrylate (PMMA), and polyvinylidene fluoride (PVDF), among others.

In examples where the layer 1730 includes a liquid electrolyte material, the layer 1730 can include a non-aqueous polar solvent. The non-aqueous polar solvent can include a carbonate such as ethylene carbonate, propylene carbonate, diethyl carbonate, ethyl methyl carbonate, dimethyl carbonate, or a mixture of any two or more thereof. The layer 1730 can include at least one additive. The additives can be or include vinylidene carbonate, fluoroethylene carbonate, ethyl propionate, methyl propionate, methyl acetate, ethyl acetate, or a mixture of any two or more thereof. The layer 1730 can include a lithium salt material. For example, the lithium salt can be lithium perchlorate, lithium hexafluorophosphate, lithium bis(fluorosulfonyl)imide, lithium bis(trifluorosulfonyl)imide, or a mixture of any two or more thereof. The lithium salt may be present in the layer 1730 from greater than 0 M to about 1.5 M. Once disposed to the battery cell 120, liquid electrolyte can be present and touching battery subcomponents present within the battery cell 120. The battery subcomponents can include the cathode, the anode, the separator, the current collector, etc.

Figure 20:
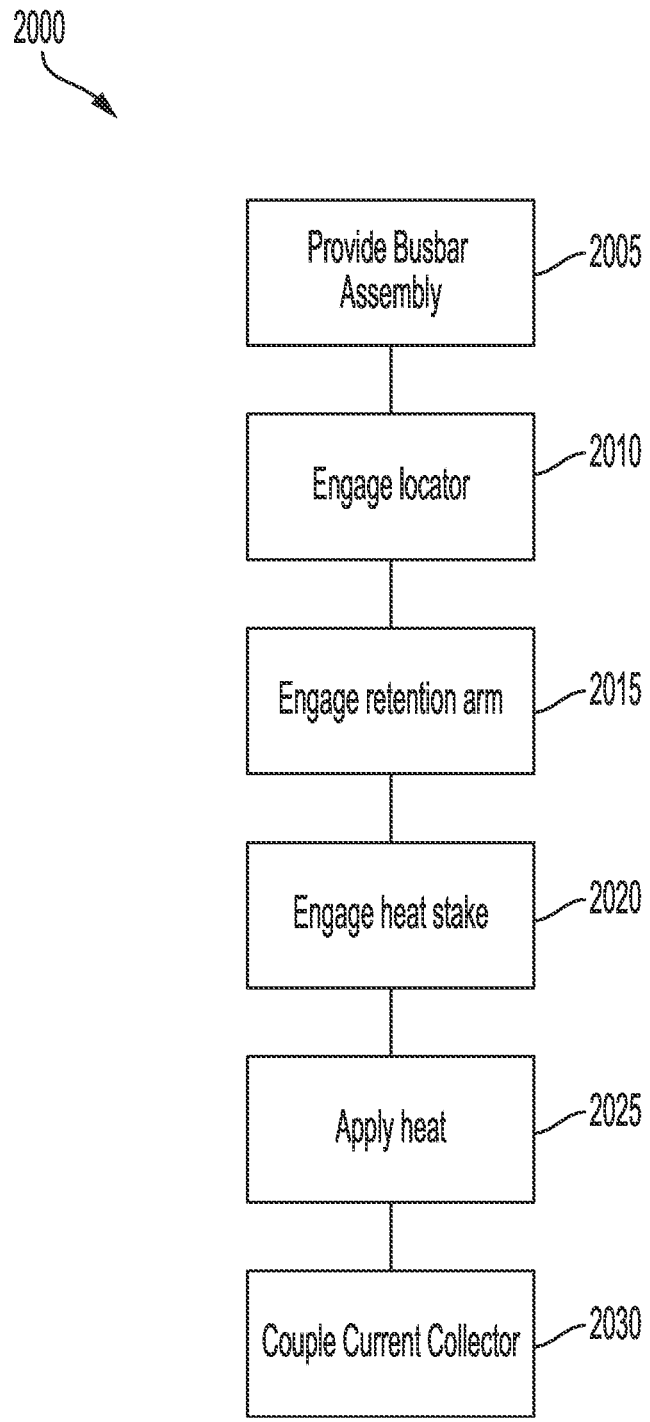
FIG. 20 is a flowchart of an example method of installing a busbar assembly, in accordance with some aspects.

FIG. 20, among others, depicts a method 2000. The method 2000 can be a method of installing a busbar assembly 400 on a cell carrier 430, for example. The method 2000 can include one or more of ACTS 2005-2030. The method 2000 can include providing a busbar assembly at ACT 2005. The busbar assembly can be the busbar assembly 400 as herein described. The busbar assembly 400 can include the busbar 405 and the overmold member 440. For example, the busbar 405 can be an electrically conductive component defining at least one opening 420. The busbar 405 can include at least one first datum locator opening 410 and at least one second datum locator opening 415. The overmold member 440 can be a polymeric member overmolded onto the busbar 405. The overmold member 440 can include at least one retention arm 445 and at least one opening 450. The opening 450 of the overmold member 440 can correspond with the opening 420 of the busbar 405. The overmold member 440 can include at least one opening 480 (e.g., holes, passages, apertures) corresponding to each of the first datum locator openings 410 and each of the second datum locator openings 415 if the busbar 405.

The method 2000 can include engaging a locator at ACT 2010. For example, the method 2000 can include engaging at least one first datum locator 425 and at least one second datum locator 427 the cell carrier 430 with the first datum locator opening 410 and the second datum locator opening 415 of the busbar 405, respectively. The cell carrier 430 can include one or more first datum locators 425 that can engage with (e.g., be received in, be received at least partially through) the first datum locator opening 410 of the busbar 405. The engagement of the first datum locator 425 of the cell carrier 430 with the first datum locator opening 410 of the busbar 405 can at least partially align the busbar 405 with the cell carrier 430. For example, the engagement of the first datum locator 425 of the cell carrier 430 with the first datum locator opening 410 of the busbar 405 can constrain a movement of the busbar 405 relative to the cell carrier 430 in at least two directions (e.g., left and right). The cell carrier 430 can include one or more second datum locators 427 that can engage with (e.g., be received in, be received at least partially through) the second datum locator opening 415 of the busbar 405. The engagement of the second datum locator 427 of the cell carrier 430 with the second datum locator opening 415 of the busbar 405 can at least partially align the busbar 405 with the cell carrier 430. For example, the engagement of the second datum locator 427 of the cell carrier 430 with the second datum locator opening 415 of the busbar 405 can constrain a movement of the busbar 405 relative to the cell carrier 430 in at least four directions (e.g., left, right, up, and down).

The method 2000 can include engaging retention arm at ACT 2015. For example, the method 2000 can include engaging the retention arm 445 of the overmold member 440 with at least one opening 455 of the cell carrier 430. The opening 455 of the cell carrier 430 can be configured to receive a tip 1100 of the retention arm 445. For example, the tip 1100 of the retention arm 445 can be inserted into the opening 455 such that a retention feature 1110 of the retention arm 445 can engage with the wall 1300 of the cell carrier 430. The engagement between the retention arm 445 and the wall 1300 of the cell carrier 430 can couple the overmold member 440 with the cell carrier 430. For example, the overmold member 440 can be detachably coupled with the cell carrier 430 with the retention arm 445 of the overmold member 440 engaged with the opening 455 of the cell carrier 430. The retention arm 445 can be coupled with the cell carrier 430 with the busbar 405 positioned at least partially between the overmold member 440 and the cell carrier 430.

The method 2000 can include engaging a heat stake at ACT 2020. For example, the method 2000 can include engaging the protrusion 435 (e.g., the heat stake 435) of the cell carrier 430 with the opening 420 of the busbar 405. The protrusion 435 can extend outward from the cell carrier 430 and can engage with (e.g., be received in) the opening 420 of the busbar. The protrusion 435 can be or include a polymeric material such that the protrusion can be configured to expand, deform, or otherwise change shape when subject to heat. The ACTS 2010-2020 can be performed simultaneously or substantially simultaneously. For example, first datum locator 425 can be received in the first datum locator opening 410 and the second datum locator 427 can be received in the second datum locator opening 415 at the same time as the retention arm 445 can engage the opening 455, which can further occur at the same time as the protrusion 435 can engage with the opening 420.

The method 2000 can include applying heat at ACT 2025. For example, the method 2000 can include applying heat to the protrusions 435 of the cell carrier 430 at ACT 2025. Heat can be applied to the protrusion 435 at ACT 2025 to expand, deform, or otherwise alter the shape of the protrusion 435. For example, heat can be applied to the protrusion 435 with the protrusion 435 extending through the opening 420. Heat can be applied locally to the protrusion 435 (e.g., via a heat gun, an iron, or some other device, such as during a heat staking operation. The protrusion 435 can expand or be deformed to couple the busbar 405 with the cell carrier 430. For example, application of heat to the protrusion 435 can cause end portion 605 of the protrusion to form, where the end portion 605 can include the diameter 610. The diameter 610 can be greater than a diameter of the opening 420. Because the diameter 610 of the end portion 605 can be greater than a diameter of the opening 420, the end portion 605 can prevent the busbar 405 from separating from the cell carrier 430.

The method 2000 can include coupling a current collector at ACT 2030. For example, the method 2000 can include coupling the current collector 465 with the busbar 405. For example, the busbar 405 can be positioned against the cell carrier 430, and the current collector 465 can be positioned atop or along a bottom surface of the submodule 300 or the submodule 305. The current collector 465 can at least one tab 920 extending over an edge 910 of the busbar 405. For example, the tab 920 can extend beyond the edge 910 and fold over the busbar 405. The tab 920 of the current collector 465 can be electrically coupled with the busbar 405. The tab 920 of the current collector 465 can be mechanically coupled with the busbar 405. The tab 920 of the current collector 465 can be welded with the busbar 405. For example, a laser welding device or some other device can emit (e.g., direct, shoot) a laser beam in the direction 915 to weld the first portion 900 of the tab 920 with the edge 910 of the busbar 405. The busbar 405 can be electrically coupled with the battery cells 120 of the submodule 300 or the submodule 305 via the electrical coupling of the tab 920 of the current collector 465 with the edge 910 of the busbar 405.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes, and omissions can also be made in the design, operating conditions and arrangement of the disclosed elements and operations without departing from the scope of the present disclosure.

For example, descriptions of positive and negative electrical characteristics may be reversed. For example, the busbar 405 can be a negative busbar or a positive busbar. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical, or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. An apparatus, comprising:
an electrically conductive member having a first opening and a second opening, the first opening configured to engage a first member of a cell carrier to at least partially align the electrically conductive member with the cell carrier, the second opening configured to engage with a second member of the cell carrier for coupling the electrically conductive member with the cell carrier;
an overmold member coupled with the electrically conductive member, the overmold member comprising an overmold opening at least partially aligned with the second opening of the electrically conductive member, wherein a portion of the electrically conductive member is exposed within the overmold opening;
the second member of the cell carrier including a heat stake, the heat stake configured to expand within the overmold opening to couple the electrically conductive member with the cell carrier.

2. The apparatus of claim 1, comprising:
an edge configured to electrically couple the electrically conductive member with a tab of a current collector, the tab to fold over the edge with the electrically conductive member coupled with the current collector.

3. The apparatus of claim 1, comprising:
an edge configured to electrically couple the electrically conductive member with a tab of a current collector, the tab to fold over the edge with the electrically conductive member coupled with the current collector, wherein a side of the electrically conductive member is positioned less than 1 centimeter from a tab edge of the tab.

4. The apparatus of claim 1, comprising:
the overmold member comprising a retention member configured to retain a cable against the overmold member.

5. The apparatus of claim 1, comprising:
the overmold member comprising a retention member and a retention clip, the retention member configured to retain a cable against the overmold member, the retention clip configured to retain a ribbon cable against the overmold member.

6. The apparatus of claim 1, comprising:
the heat stake configured to deform over the second opening when heated to couple the electrically conductive member against the cell carrier.

7. The apparatus of claim 1, comprising
the overmold member comprising a retention arm configured to engage with a cell carrier opening of the cell carrier to couple the overmold member with the cell carrier, the electrically conductive member positioned at least partially between the overmold member and the cell carrier with the retention arm engaged with the cell carrier opening.

8. The apparatus of claim 1, comprising:
the overmold member comprising a retention arm and an overmold opening, the retention arm configured to engage with a cell carrier opening of the cell carrier to couple the overmold member with the cell carrier, the electrically conductive member positioned at least partially between the overmold member and the cell carrier with the retention arm engaged with the cell carrier opening; and
the heat stake configured to expand within the overmold opening when heated to couple the electrically conductive member with the carrier.

9. The apparatus of claim 1, comprising:
the electrically conductive member configured to couple with a terminal block, the terminal block having a terminal block material thickness that is greater than a material thickness of the electrically conductive member.

10. The apparatus of claim 1, comprising:
the electrically conductive member configured to couple with a terminal block, the terminal block having a terminal block material thickness that is greater than a material thickness of the electrically conductive member, the terminal block having a plating that differs from a plating of the electrically conductive member.

11. The apparatus of claim 1, comprising:
the electrically conductive member configured to couple with a terminal block, the terminal block having a terminal block material thickness that is greater than a material thickness of the electrically conductive member, wherein a corner is defined by the electrically conductive member and the terminal block with the electrically conductive member coupled with the terminal block.

12. The apparatus of claim 1, wherein the electrically conductive member is a busbar for a battery module, and wherein the cell carrier is a tote for the battery module.

\* \* \* \* \*